United States Patent [19]
Staar

[11] 3,733,078
[45] May 15, 1973

[54] APPARATUS FOR PLAYING MULTIPLE TAPE CARTRIDGES

[75] Inventor: Marcel Jules Helene Staar, Brussels, Belgium

[73] Assignee: Staar Development Company S. A., Brussels, Belgium

[22] Filed: Aug. 12, 1969

[21] Appl. No.: 849,484

[30] Foreign Application Priority Data

Aug. 13, 1968 Belgium ................................62195

[52] U.S. Cl. .......274/4 F, 179/100.2 CA, 179/100.2 MD, 274/4 A

[51] Int. Cl. ........................G11b 21/10, G11b 23/12

[58] Field of Search .....................274/4 F, 11 E, 4 A, 274/11 A; 179/100.2 Z, 100.2 MI, 100.2 CA; 340/174.1; 242/180, 181; 352/6–8; 353/15

[56] References Cited

UNITED STATES PATENTS

| | | | |
|---|---|---|---|
| 2,821,576 | 1/1958 | Gaubert | 274/4 F UX |
| 3,012,116 | 12/1961 | Boylan | 335/205 |
| 3,185,776 | 5/1965 | Bender | 274/4.2 X |
| 3,327,077 | 6/1967 | Morris | 335/205 X |
| 3,431,367 | 3/1969 | Nickl | 274/4 F UX |
| 3,492,005 | 1/1970 | Ueno | 274/4 B |
| 3,504,916 | 4/1970 | Ban | 274/4 F |
| 3,511,940 | 5/1970 | Lemelson | 179/100.2 MI |
| 3,578,336 | 5/1971 | Ban | 179/100.2 Z |

FOREIGN PATENTS OR APPLICATIONS

| | | | |
|---|---|---|---|
| 877,173 | 9/1961 | Great Britain | 274/4 F |

*Primary Examiner*—Leonard Forman
*Assistant Examiner*—Dennis A. Dearing
*Attorney*—Wolfe, Hubbard, Leydig, Voit & Osann

[57] ABSTRACT

An apparatus for playing a number of self-contained cartridges of magnetic recording tape in sequence or a selected order. The cartridges are loaded in a stationary frame, and a moving slide is driven in a scanning movement past the stack of cartridges in the frame. The slide bears the playback head and cartridge moving elements and is adapted to stop adjacent each or a selected cartridge, to engage the cartridge with the moving elements and move it into engagement with the playback head and a tape capstan to play sound recordings on the tape. A full cycle of operation is provided in which the slide is returned to a position adjacent the first cartridge in the stack after all loaded in the frame have been played in sequence.

7 Claims, 64 Drawing Figures

INVENTOR
MARCEL JULES HELENE STAAR by: Wolfe, Hubbard, Voit & Osann
ATTYS.

INVENTOR
MARCEL JULES HELENE STAAR
by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit + Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

INVENTOR
MARCEL JULES HELENE STAAR by: Wolfe, Hubbard, Voit & Osann
ATTYS.

APPARATUS FOR PLAYING MULTIPLE TAPE CARTRIDGES

DESCRIPTION OF THE INVENTION

This invention relates to a changer for self-contained cartridges of magnetic recording tape.

The main object of the invention is to provide a changer which may be loaded manually with a plurality of tape cartridges, and by means of which the cartridges may be played consecutively.

Another object is to provide for scanning the cartridges loaded in a storage frame for the presence of a cartridge at each of adjacent possible locations, and for bringing the playback mechanism into operative association with a cartridge at its location in the frame.

A further object is to provide for a complete cycle of operation in which after all of the cartridges loaded in the frame have been played in sequence, the mechanism will be automatically stopped to allow reloading of fresh cartridges.

Another object is to provide for selecting recording tracks for playback in multi-track tape cartridges.

Another object is to provide a changer mechanism which is fast and efficient in operation, and suited for mass production.

Other objects and advantages of the invention will become apparent upon reading the following detailed description and upon reference to the drawings in which.

Figure 2:
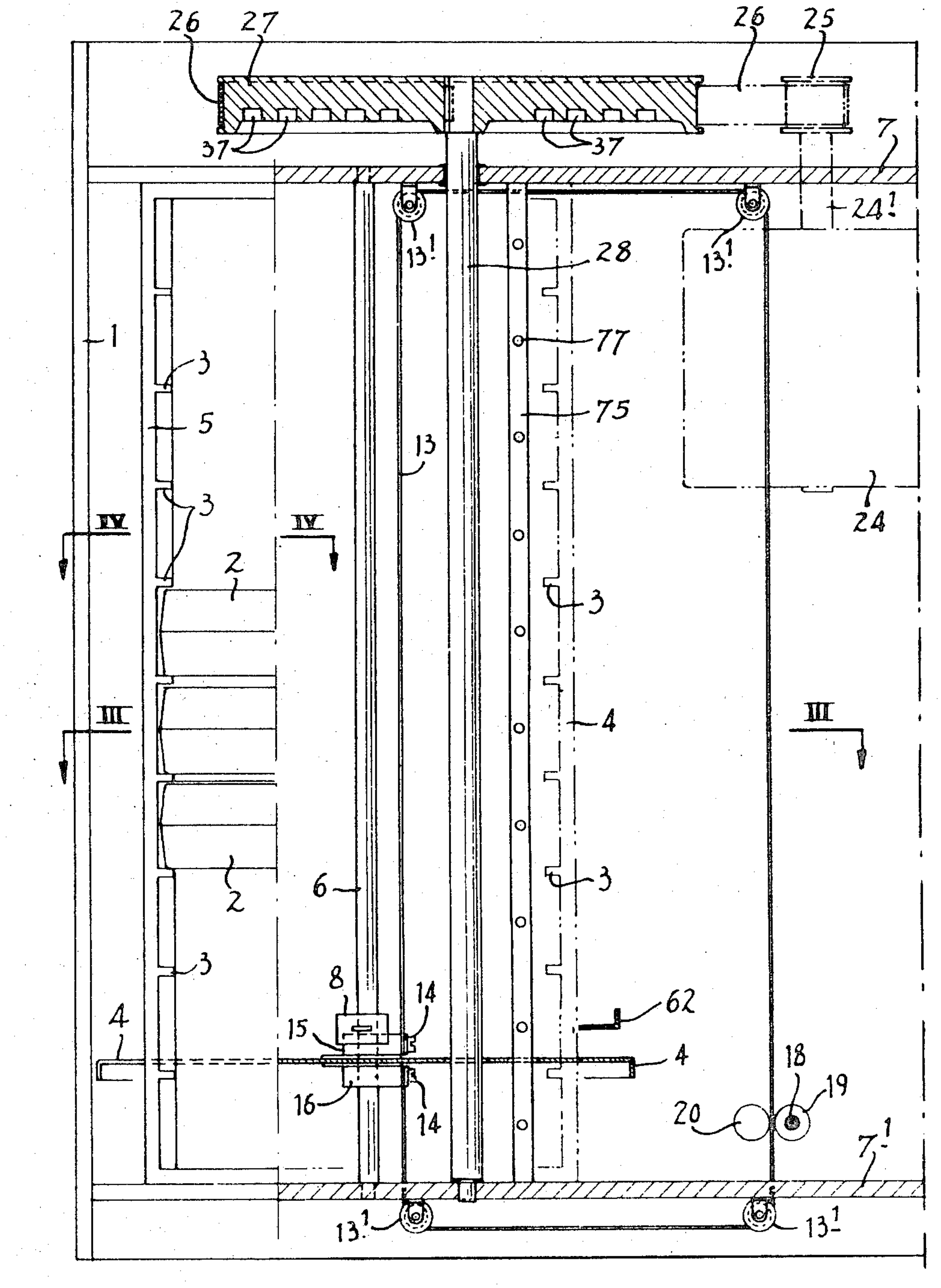
FIG. 2 is a view partly in elevation and partly in vertical section of the changer apparatus illustrating the stack of cartridges in position in the frame and the scanning mechanism near the lower end of the frame and adjacent the cartridge next to the bottommost cartridge in the frame.
Figure 4:
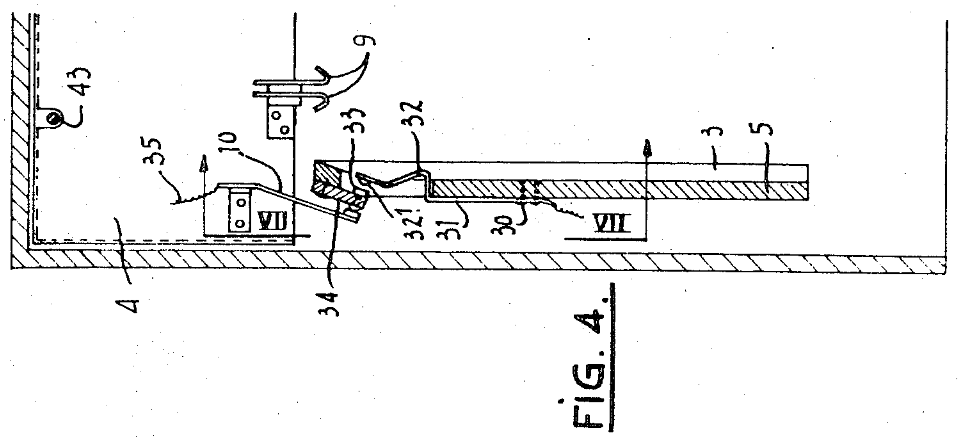
Figure 3:
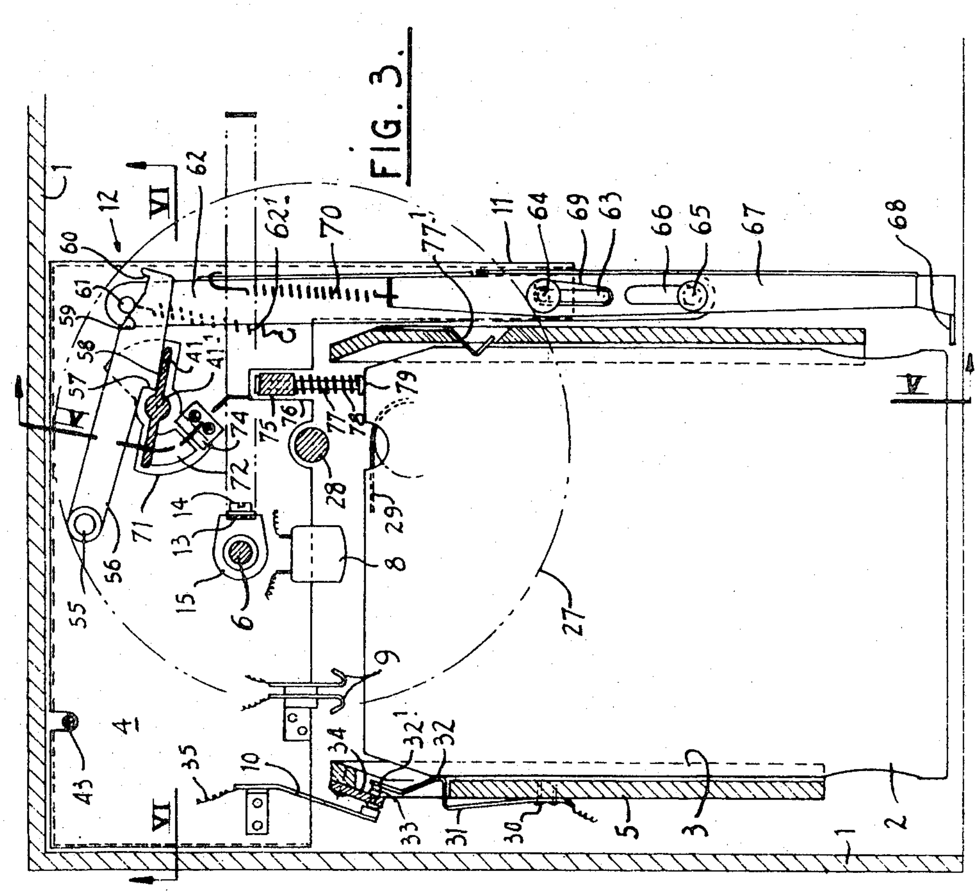
Figure 5:
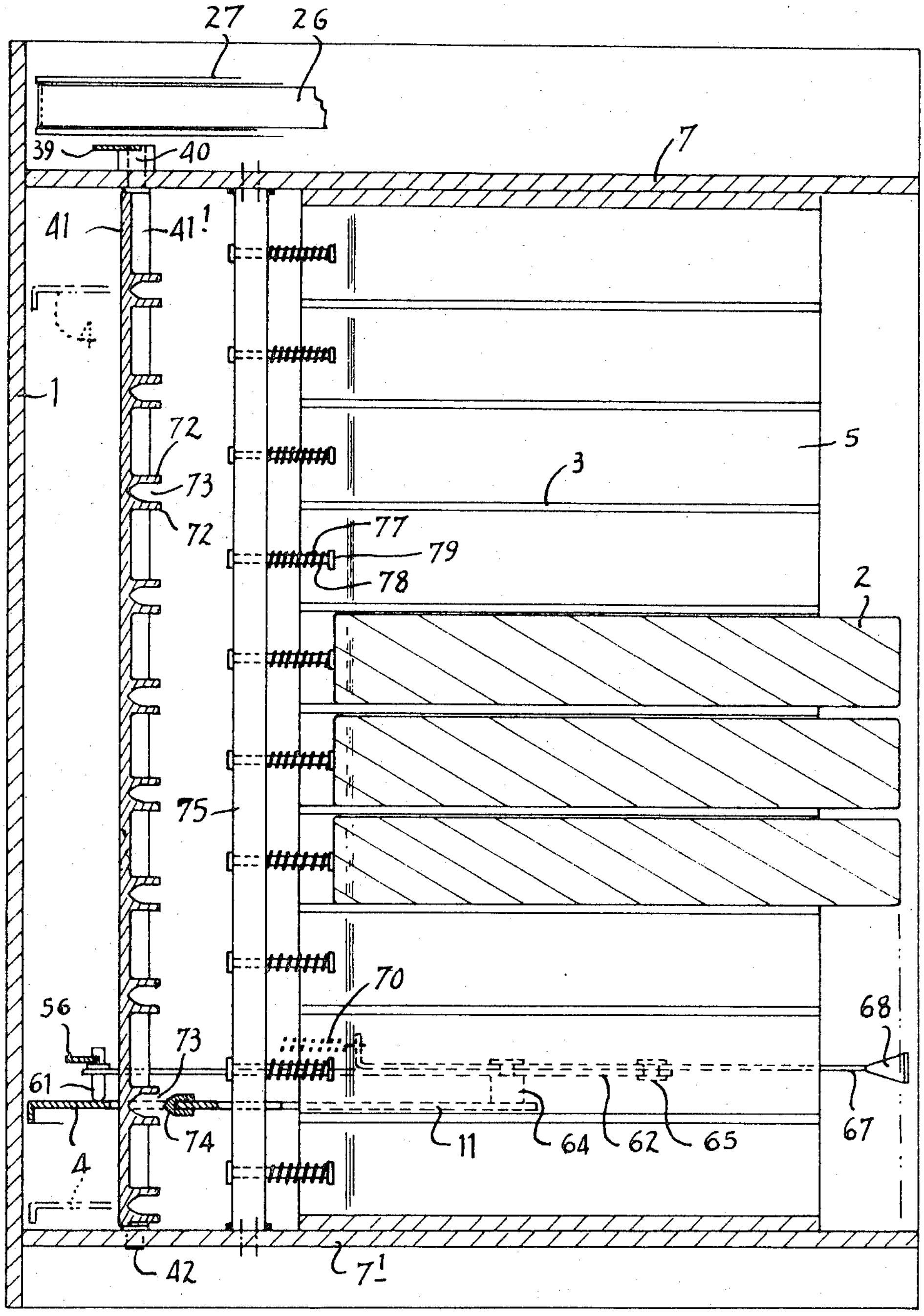
Figure 6:
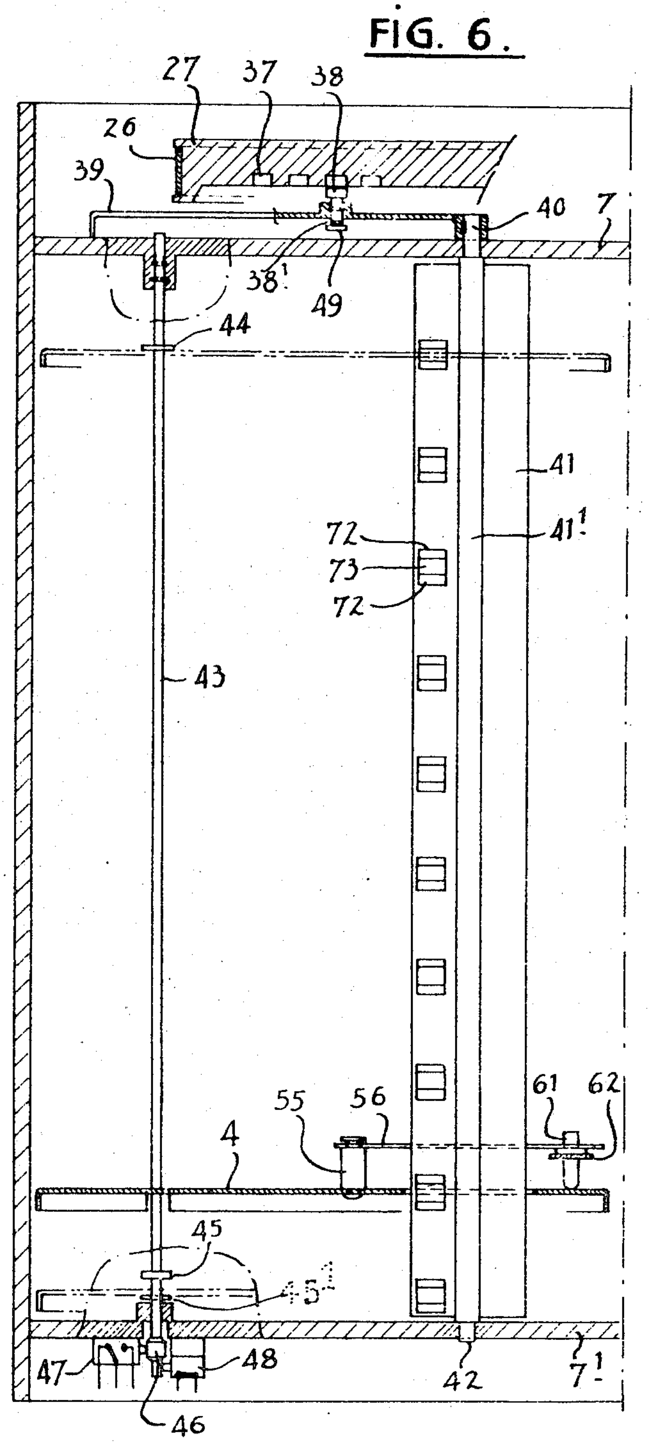
Figure 7:
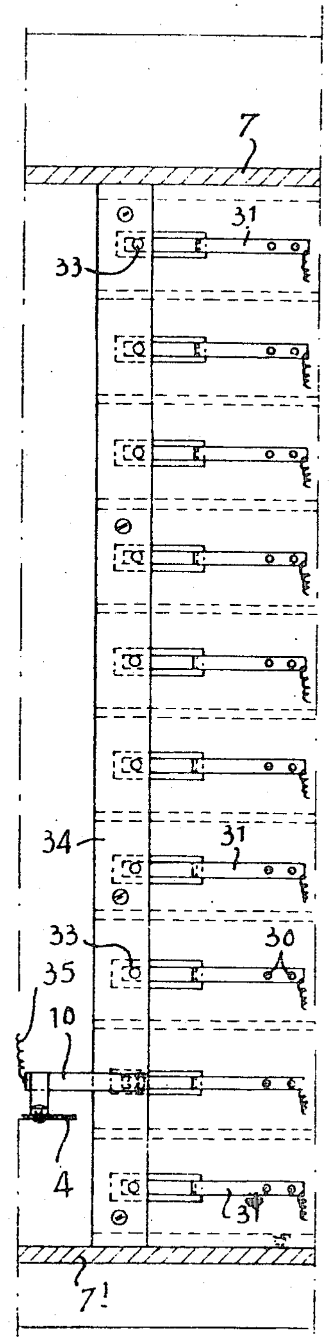
Figure 8:
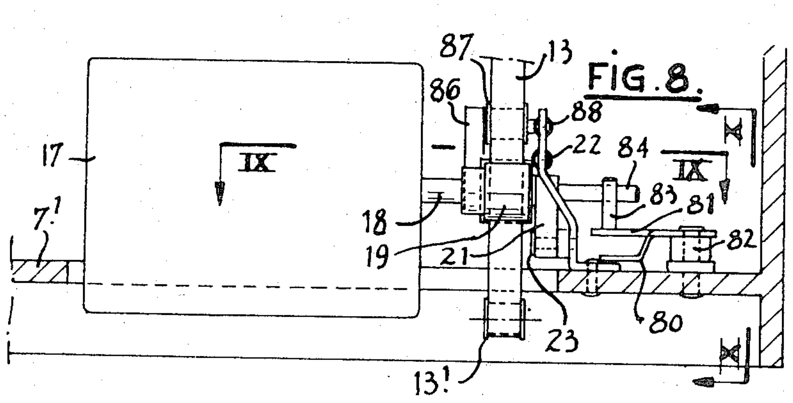
Figures 9, 12:
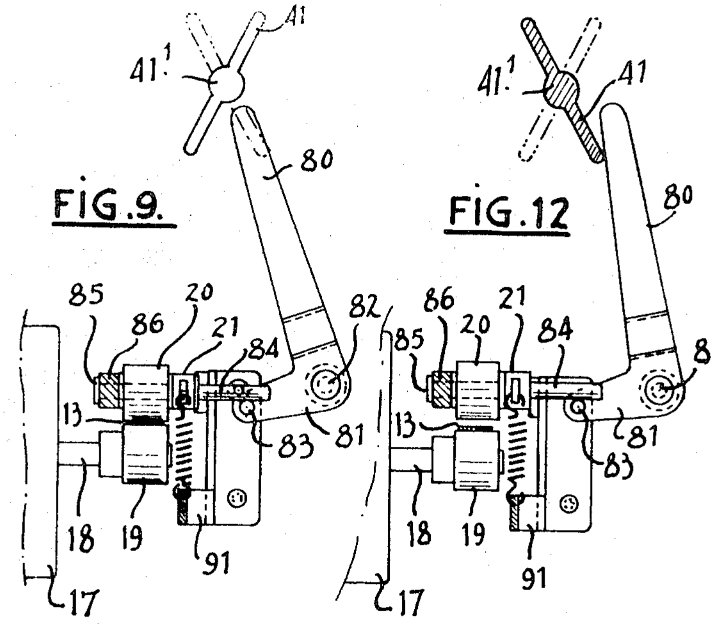
Figure 13:
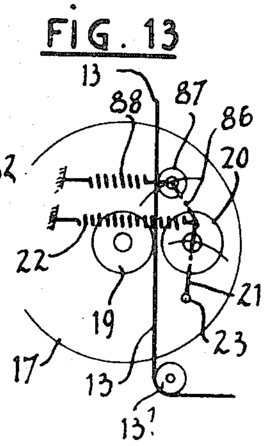

FIGS. 3 and 4 are views in horizontal section taken substantially in the planes of lines 3—3 and 4—4 of FIG. 2;

FIGS. 5 and 6 are vertical sections taken substantially in the planes of lines 5—5 and 6—6 of FIG. 3;

FIG. 7 is a section taken substantially in the plane at lines 7—7 of FIG. 4;

FIGS. 8–13 are fragmentary views partly in section and partly in elevation illustrating the portion of the mechanism for clutching and declutching the slide drive motor;

FIGS. 14–30 are fragmentary views partly in section and partly in elevation showing the mechanical elements for operating the scanning mechanism;

FIGS. 31–36 are circuit diagrams illustrating the various phases of the control circuit utilized in the changer mechanisms;

FIGS. 37–43 are fragmentary views taken partly in elevation and partly in section illustrating the mechanical elements utilized in selection of individual recording tracks in multi-track tape cartridges in the operation of the changer mechanism;

FIGS. 44–49 are circuit diagrams showing the various portions of the control circuit utilized in connection with the mechanical elements of FIGS. 38–43;

FIGS. 50–56 show the construction and operation of the elements associated with the selection table; and FIGS. 57–64 are circuit diagrams showing the phases of operation in utilizing the selection table and associated mechanism.

While the invention will be described in connection with the preferred and alternative embodiments, it will be understood that the invention is not limited in applicability to those embodiments but is equally applicable to alternatives and equivalent constructions.

Turning to the drawings, there is shown in FIGS. 1–36, a changer apparatus constructed according to this invention as comprising a stationary frame 1 which may be loaded with a plurality of cartridges each of which is slidably received in a set of guides 3 formed in side uprights 5. The cartridges are manually loaded into the guides 3 so as to be located in a stack at adjacent levels. A vertically movable scanning slide 4 is provided, which is supported by a vertical guide 6 retained in frame members 7, 7¹. The slide 4 is adapted to take up a position in front of any one of the cartridges stacked in the frame and to bring into association therewith the playback elements for playing recordings on the recording tape in the cartridge.

In accordance with the invention, the slide 4 is movable to scan each of the possible cartridge locations in the storage frame 1, and includes means to detect at each level whether a cartridge is present or has been selected, for example, by a push button mechanism, and if a cartridge is present, to initiate tape playback. To this end, the slide 4 is adapted for relatively rapid movement, and thus bears only relatively light weight items, the heavy items being mounted on the frame 1. Thus, there is disposed on the slide 4 in the present case, a playback head 8, tape position feelers 9 (FIG. 3), and a feeler 10 for detecting for presence of a cartridge at each level of the storage frame. Means are also provided for positively moving the cartridges into playing position against the playback head 8, said means 12 including levers 56, 62 disposed on a flat portion 11 which projects from one side of the slide 4.

The slide 4 is driven in descending scanning movement from an initial level opposite the uppermost cartridge, by a band 13 which runs over deflecting rollers 13¹ and which has its ends secured, as by screws 14, to members 15, 16 rigidly secured to the slide 4. The band 13 is driven by a motor 17 which is visible in FIG. 1 having a shaft 18 bearing a roller 19 which contacts the band 13 and which cooperates with a roller 20. Driving contact between the roller 19 and the band 13 is selectively obtained by a lever 21 which is normally biased by a spring 22 to engage the roller 19 but which is pivotable around a stationary pivot pin 23 to disengage the roller 19 by a lever 80, as shown in FIGS. 9–13.

Fixed on the stationary frame are the motor 17, a motor 24 (FIG. 2) having a shaft 24¹ which drives via a pulley 25 and a belt 26 a flywheel 27 which is secured to a shaft 28 and which acts as a capstan to drive the magnetic tape 29 of the cartridge at each level (FIGS. 2, 3).

Secured at the location or level of each cartridge are means engaged by the scanning feeler 10 on the slide 4 to indicate the presence or selection of a cartridge at that level in the frame 1. In the present case, said means includes conductive strips 31 (FIGS. 3, 4, 7) which have a bent part 32 directed towards the cartridge location and secured on the frame by screws 30, and a free end which by way of contacts 32' makes contact with studs 33 secured in a row in an insulated strip 34. The feeler 10 carried by the slide 4 also contacts the studs 33, but on the other side of the strip 34. Thus, there is a conductive strip 34 at each cartridge location, and when no cartridge is in a given location, between a set of guides 3, or the cartridge at that location has not been selected the conductive strip 31 is in the position which is shown in FIG. 4 in which the contact 32' does not make with the stud 33. When a cartridge is introduced, the corresponding conductive strip 31 moves into the position shown in FIG. 3 and an electrical connection can be produced by the elements 31-32-32'-33-10. If the apparatus is a cartridge selection type, that is, one in which each location can contain a cartridge and the operator selects which cartridge he wishes to be played, a push button, for example, would be associated with each cartridge location and it would be activated to move strip 31 to the position shown in FIG. 3 for playing the selected cartridge.

Figure 15:
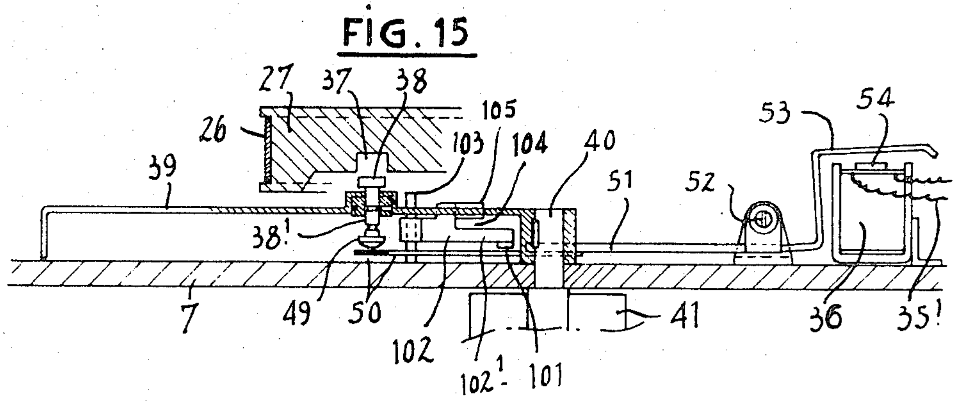
Figures 14, 16, 17:
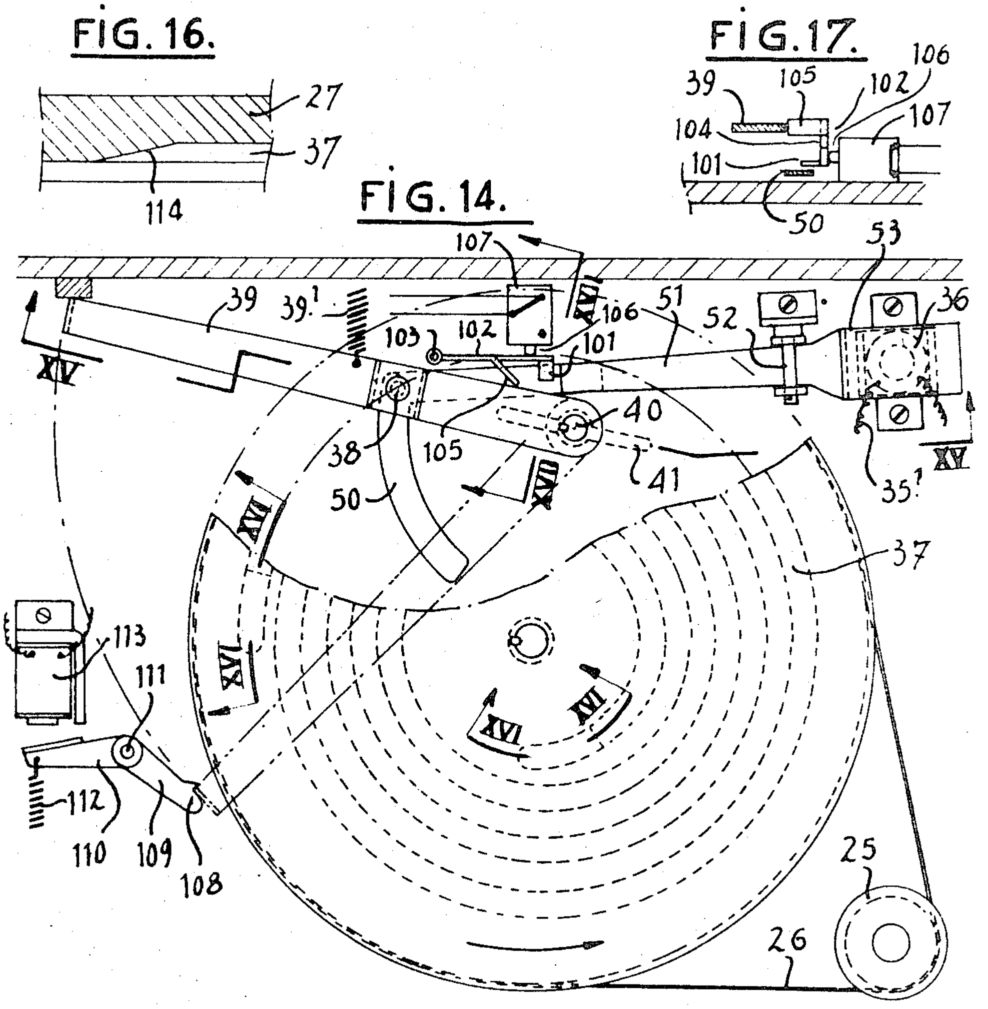

In its scanning movement, the slide 4 consecutively scans the cartridge locations; if it finds a cartridge in position, an electrical connection is made via lines 35, 35' to a solenoid 36 (FIGS. 3, 14 and 15). A continuous scanning cycle is provided, and when the slide 4 has fully descended and scanned the final cartridge, the driving motor 17 for the slide is reversed, and it is returned to the level opposite the first cartridge.

When the scanning means on the slide 4 detects a cartridge in position in the frame, and responsive thereto the solenoid 36 is energized, the cartridge moving means 12 on the slide 4 is brought into operation to positively move the cartridge into playing position against the playback head 8. To drive a linkage including the levers 56, 62 which move the cartridge, the bottom surface of the flywheel 27 is formed with a spiral groove 37 engageable by a finger 38 and slidable by way of an appendix 38' in, and extending through, a lever 39 (FIG. 15) movably mounted on the upper frame plate 7. The lever 39 has one end secured to a pin 40 (FIG. 6) which, after having extended through the frame plate 7, bears a butterfly cam 41 (FIGS. 6 and 15) which extends vertically to the lower plate 7' in which the cam 41 is mounted for rotation on a pin 42. When the slide 4 is opposite a cartridge received in a set of the guides in the main frame 1, the levers 56, 62 on the slide are operable by the butterfly cam 41 to engage and move the cartridge into playback position against the force exerted by one of the return springs 77. Also extending between the frame plates 7 and 7' is a rod 43 (FIG. 6) having abutments 44, 45 adapted to be operated by the moving slide 4 when the same reaches a top or bottom end position where it causes the rod 43 to slide, the rod 43 being adapted to act by way of a protuberance 46 on a changeover switch 47 and on an on-off switch 48 so as to reverse the direction of rotation of the slide drive motor 17, as will be described hereinafter, to return the slide 4 and complete the scanning cycle.

Figure 1:
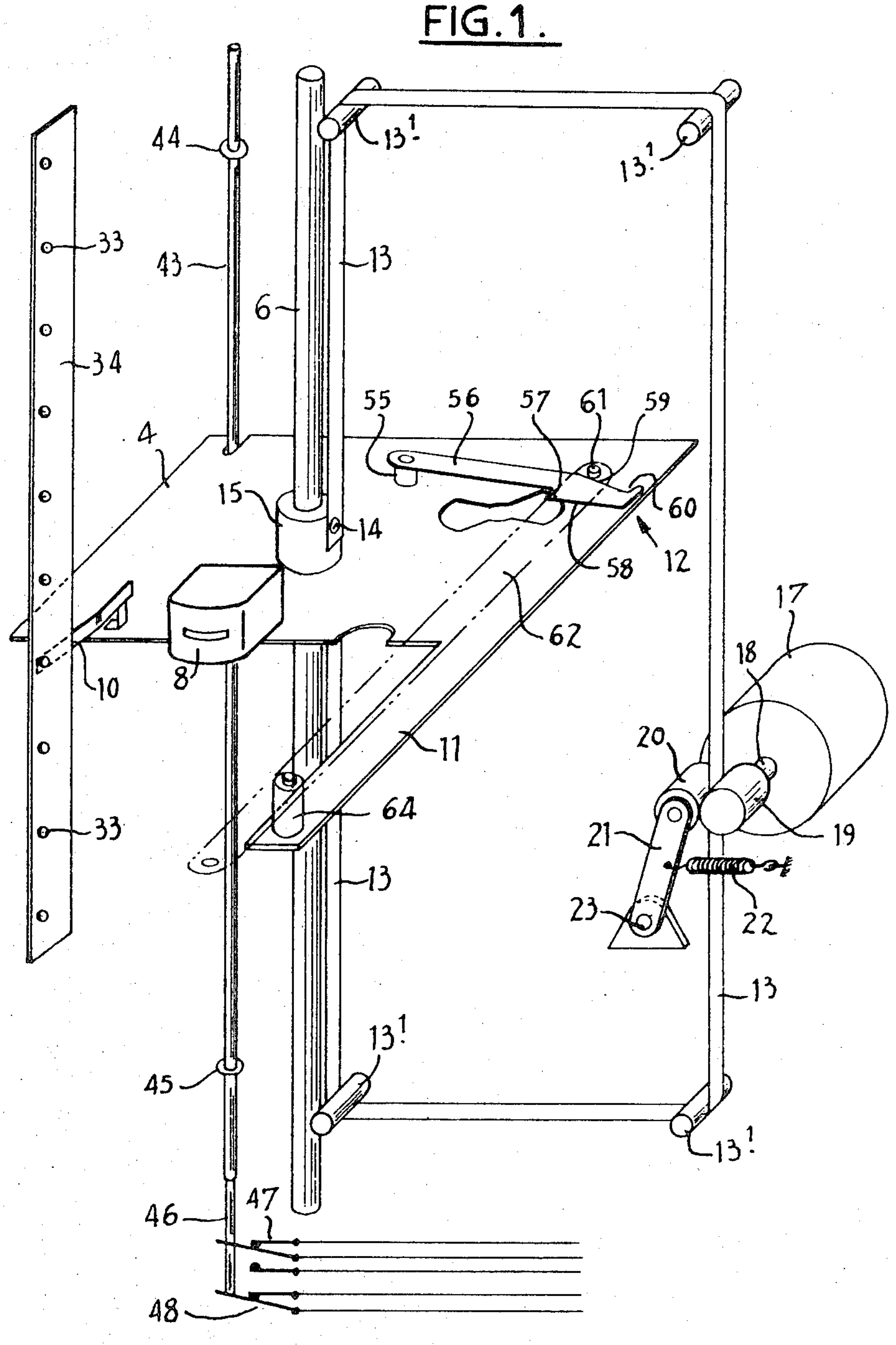
FIG. 1 is a diagrammatic perspective view of a portion of the changer apparatus including the mechanism for scanning a stack of tape cartridges loaded in the frame of the apparatus, the scanning mechanism including a playback head for sound reproduction from recording tracks on any one of the cartridges in the apparatus.
Figure 29:
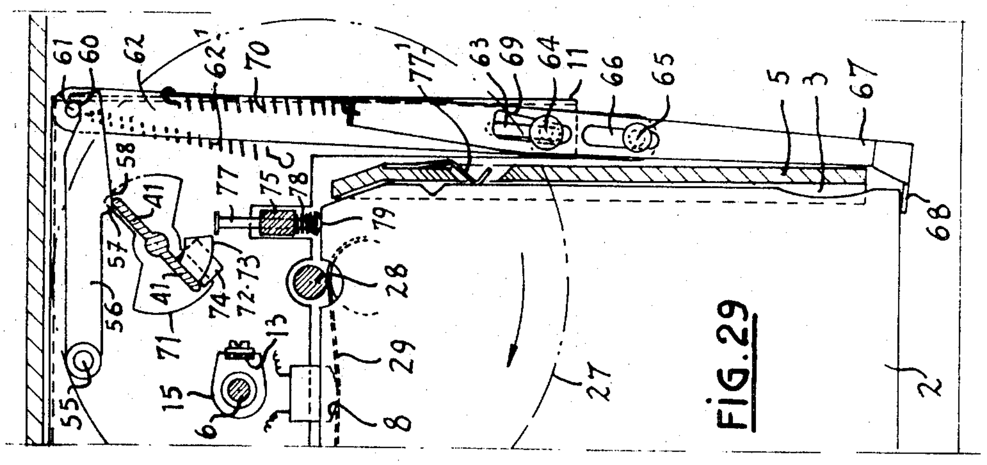
Figure 28:
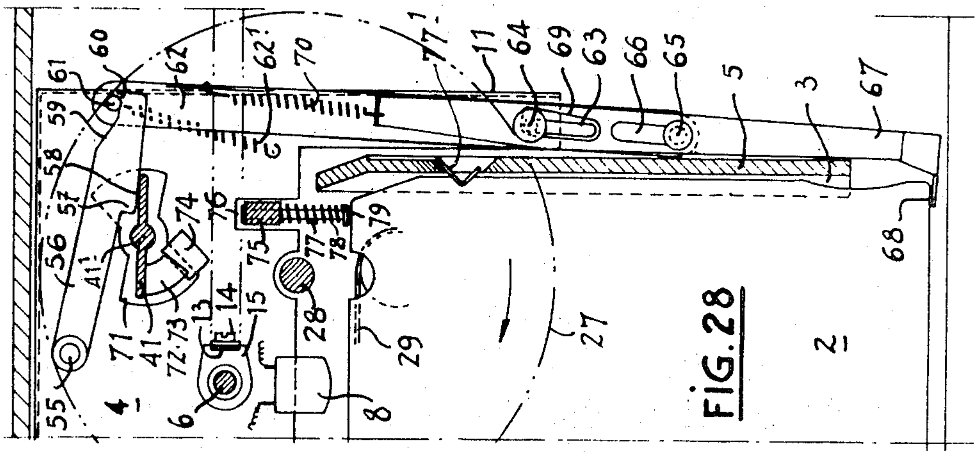

Referring again to the operation of the linkage for moving the cartridge, the finger 38 has a head 49 at the bottom adapted to cooperate with a spring strip 50 (FIG. 15) secured to a pivoted lever 51 which can pivot on a pivot 52 and which has a bent part 53 adapted to cooperate with an armature 54 of the solenoid 36. Thus the solenoid 36 when energized inserts the finger 38 into the groove 37 in the flywheel 27. The flat lever 56 is pivotally mounted on a pivot pin 55 on the slide 4 and on one edge, after a step 57, has a surface 58 which one wing of the butterfly cam 41 is adapted to contact (FIGS. 1 and 3). On the opposite edge and near its end the flat lever 56 has an inclined surface 59 and, right at the end, a hook 60. Cooperating with the inclined surface 59 is a tenon 61 on the end of the lever 62. A spring 62' (FIG. 3) biases the lever 62 which rests on slide 4 and can pivot and slide in a slot 63 on a pin 64 borne by slide extension 11. The lever 62 has, at the end opposite the tenon end, a pivot pin 65 on which another lever 67 terminating in a hook 68 can pivot and slide by way of a slot 66. The hook 68 is pivotable laterally, when the lever 67 pivots, to a position as shown in FIG. 28 adjacent the end of the cartridge, so as to effective to move the cartridge to the playing position as shown in FIG. 29. Lever 67 is formed with a slot 69 whose longitudinal edges diverge so as to allow the pivotal and sliding movement of the lever 67 and through which the pivot pin 64 extends. A spring 70 has one end secured to that end of the lever 67 which is opposite the hook 68; the other end of spring 70 is secured to the lever 62 (FIG. 3).

The slide 4 is formed with an aperture 71 in shape resembling two sectors having their apexes disposed opposite one another, the aperture 71 being disposed near a longitudinal central spindle 41' of the cam 41. Aperture 71 is shaped to enable butterfly cam 41 to rotate during the cartridge moving operation to be described in more detail hereinafter.

The butterfly cam 41 is formed along its length, at each slide stop level, opposite each set of cartridge guides 3, with pairs of teeth (FIGS. 3 and 5), the teeth of each pair cooperating to bound a zone 73 adapted to receive a spur 74 formed on one of the edges of one of the segments or sectors of the aperture 71. Disposed between the upper and lower frame plates 7 and 7' is a fixed member 75 of substantially rectangular cross-section which extends through an aperture 76 (FIG. 3) in the periphery of the slide 4 and which has at the level of each set of cartridge guides 3, a rod 77 having the cartridge return spring 78.

When the apparatus is loaded, a retaining spring 77' which fits into a notch in the side of the cartridge casing keeps each cartridge 2 in engagement with the head 79 of the rod 77 (FIG. 3). When any cartridge is moved into playing position by the cam 41 via the linkage 56, 62, 67, the return spring 78 is compressed, and at the completion of playback, the spring 78 returns the cartridge to its initial position.

Also, as can be seen in FIGS. 8–13, cam 41 can act on the pinch roller 20 by way of a bent lever 80, 81 which is pivotally mounted at a place 82, one arm 81 of the lever bearing a pin 83 adapted to act on an extension 84 of the pinch-roller spindle. This helps to substantially relieve engagement between the band 13 and the driving pulley 19, and band 13, once disengaged from pulley 19 and roller 20, is free to follow the slight shifts of the slide 4 during the positioning thereof, so that the slide-mounted elements can be positioned accurately relatively to a cartridge for effective engagement therewith.

Figure 10:
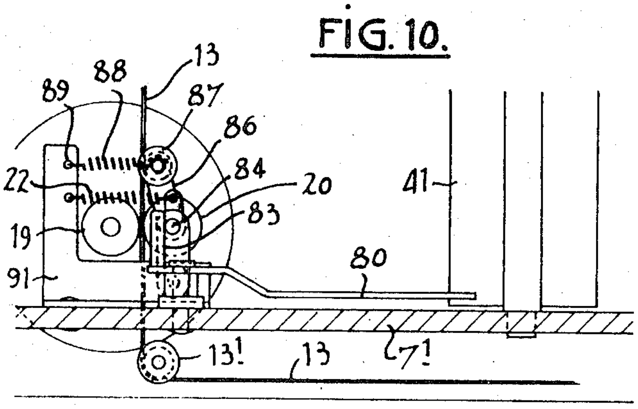
Figure 11:
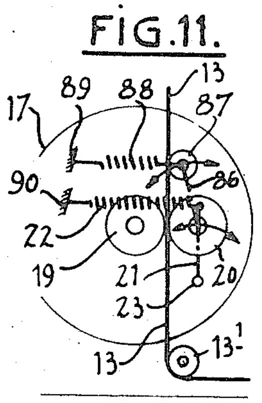

Referring to FIG. 10, pivoted to an extension 85 of the spindle of roller 20 is a lever 86 bearing a roller 87 which is biased by a spring 88 secured at one end 89 and which serves to guide and tension the band 13. The pivot spindle 23 of lever 21, and the ends 89, 90 of the springs 88, 22, are disposed on a support member 91 rigidly secured to the lower frame plate $7^1$.

Referring to FIGS. 14, 15 and 17, means including a lever 102 are shown for actuating an on-off switch 107 at the end of the cycle of operation of the apparatus. The lever 102 has a foot 101 resting on the end of the lever 51. The lever 102 is slidable on and pivoted around a spindle 103 and formed with a recess 104 between the arm $102^1$ bearing the foot 101 and an arm 105 which is bent (FIG. 14) towards the edge of lever 39, the arm 105 normally contacting the last-mentioned edge. The button 106 of the on-off switch 107 (FIG. 14) is contacted by the lever 102 when the latter is moved by the lever 39 at cycle end.

Operation of the apparatus will be described hereinafter with reference to FIGS. 1–30 and to the circuit diagrams shown in FIGS. 31–36.

Figure 31:
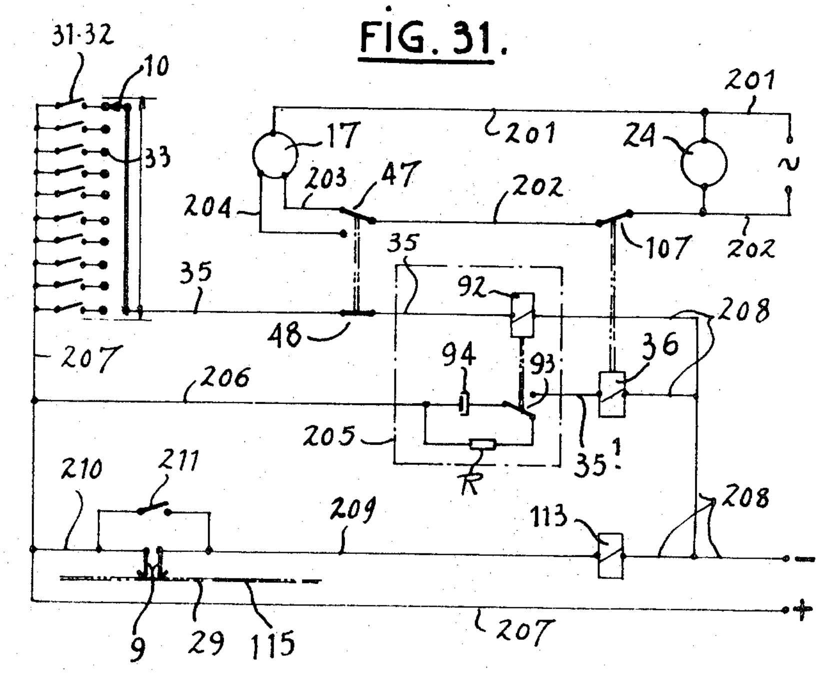
Figure 32:
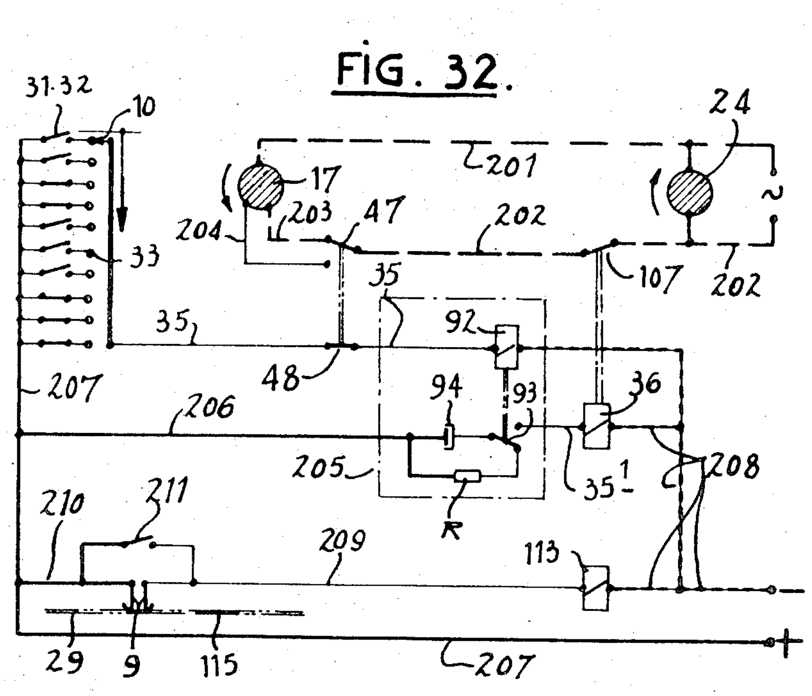

In the basic circuit diagram in FIG. 31, there can be seen supply lines 201, 202 for the motors 17, 24. The switch 107 (FIG. 14) is disposed in the line 202 and, when opened, stops the motor 17. The line 202 also connects to the reversing switch 47 which is operated by the rod 43 (FIG. 1) and via which current flows either to conductor 203 or to conductor 204 (FIG. 31) and thus determines the direction of rotation of the slide motor 17, to raise or lower the slide 4. Also visible in FIG. 31 are diagrammatic representations of the conductive strips 31–32 and studs 33 of FIGS. 1 and 3 for indicating the presence of a cartridge at any particular location, and the feeler 10 carried by the slide 4 to which the line 35 is connected. Disposed in the line 35 is a switch 48 which is also operated by rod 43 and which is associated with an electrical device 205 comprising a relay 92 to which line 35 leads, relay 92 operating a changeover switch 93 having connected to one side a wire $35^1$ leading to solenoid 36 (FIG. 15). Connected to a wire 206 branching off from conductor 207, which is connected to the conductive strips 31, is a capacitor 94 which is connected to the changeover switch 93 and across which a resistance R connected to one side of the changeover switch 93 can be shunted. The conductor 207 is connected to a d.c. supply.

The negative side of the supply is connected via conductor 208 to solenoids 36, 92, 113; solenoid 113 controls release of lever 39 (FIG. 25) and upon return movement of the butterfly cam 41 by release of the lever 39, release of the cartridge just played. Conductor 209 connects a leaf of one of the tape position feelers 9 to the solenoid 113, whereas the other leaf of the feeler 9 is directly connected via conductor 210 to the positive side of the supply. A switch 11 is adapted to shortcircuit the two leaves of the feeler 9 and forms a reject switch.

When the apparatus is operating, the motor 24 rotates continuously and drives capstan 28 and flywheel 27. If, upon initiation of operation, the slide 4 is at a level which is empty and contains no cartridge, the motor 17 starts to rotate and via band 13 drives slide 4 which, during its descending movement, scans the location allotted to the first cartridge. If a cartridge is in that location, the motor 17 will be caused to stop; if not, motor 17 will continue to operate to continue the descending movement of the slide to scan each succeeding level for a cartridge. When a cartridge is detected at a given level, the motor 17 will be caused to stop. To this end, if a cartridge is at a given level, it will close the contact 33 for that location to the positive supply line 207 via strip 31, 32, as shown in FIG. 3. Otherwise, the contact 33 will be open, as shown in FIG. 4. The circuit of FIG. 33 assumes that there are cartridges in the third, fourth, eighth, ninth and tenth locations. The feeler 10 has been moved by the slide 4 in this case to the location corresponding to the third cartridge. Because of the closed circuit 31, 32, 33 of that location, current flows through wire 35 and switch 48, energizing the relay 92 which operates changeover switch 93. The switch 93 connects the capacitor 94 and the solenoid 36 in a series circuit across the supply lines 207, 208. The solenoid 36 is energized for a period of time determined by the size of the capacitor 94, the size being determined to give satisfactory mechanical operation. When the capacitor 94 becomes substantially charged, the solenoid 36 drops out, dropping out its normally closed contacts 107 thereby opening the circuit to the motor 17 and stopping the descending movement of the slide.

Figures 18, 19, 20, 21, 22, 23, 24:
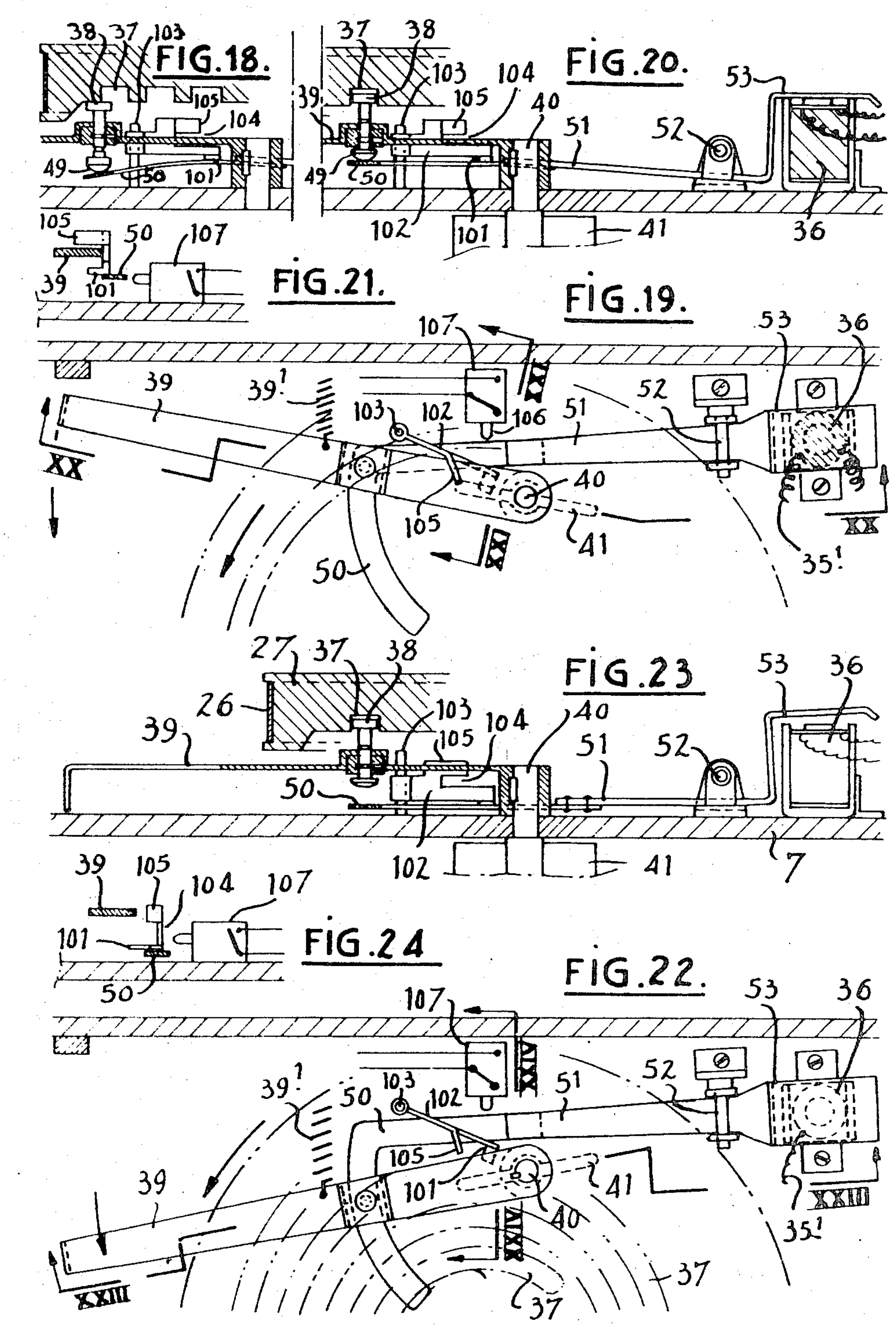
Figure 26:
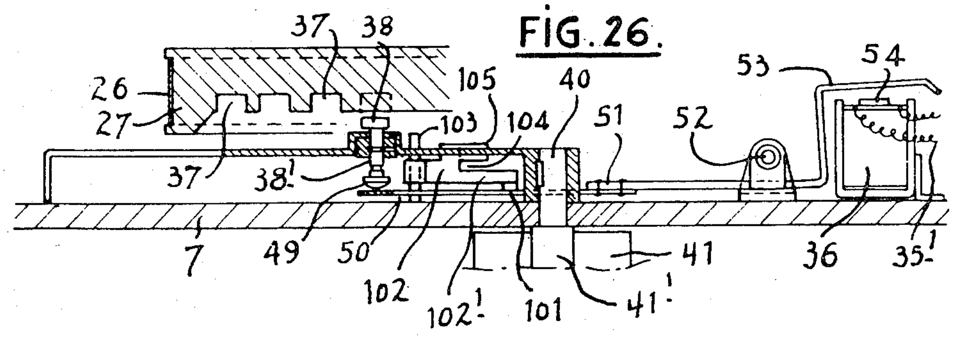
Figure 33:
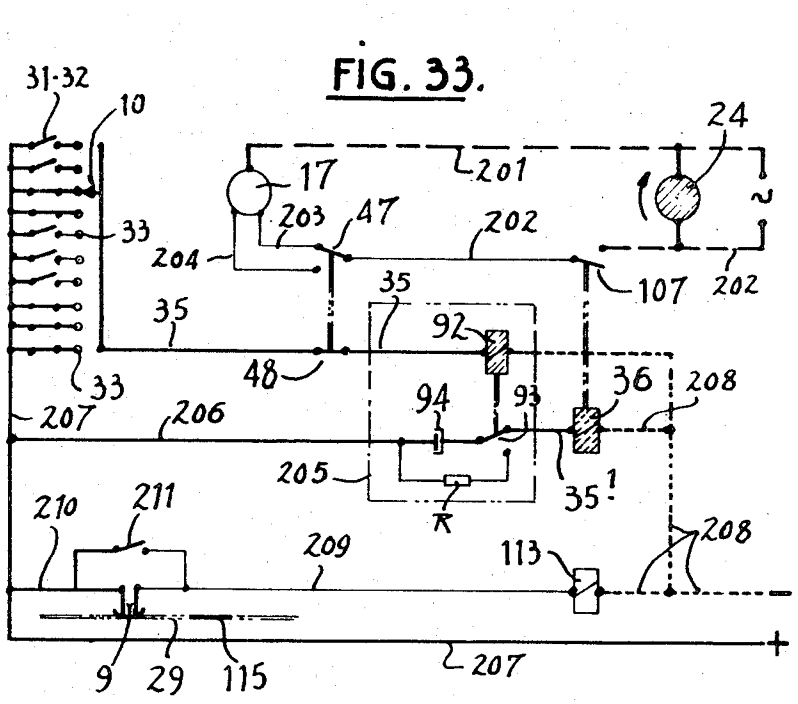

When energized, the solenoid 36 pivots lever 51, 53 (FIG. 20), which in turn acts to slide the lever 102 upward along its spindle 103. When the recess 104 of lever 102 has reached the level of the lever 39 (FIG. 20), the bent part 105 disengages from the edge of lever 39 (FIG. 19), allowing lever 102 to pivot around pin 103 and release button 106 of switch 107 (FIGS. 18, 19 and 33). Switch 107 opens and stops the motor 17, so that the slide 4 stops opposite the cartridge in the third location. This completes the scanning function.

Figures 25, 27:
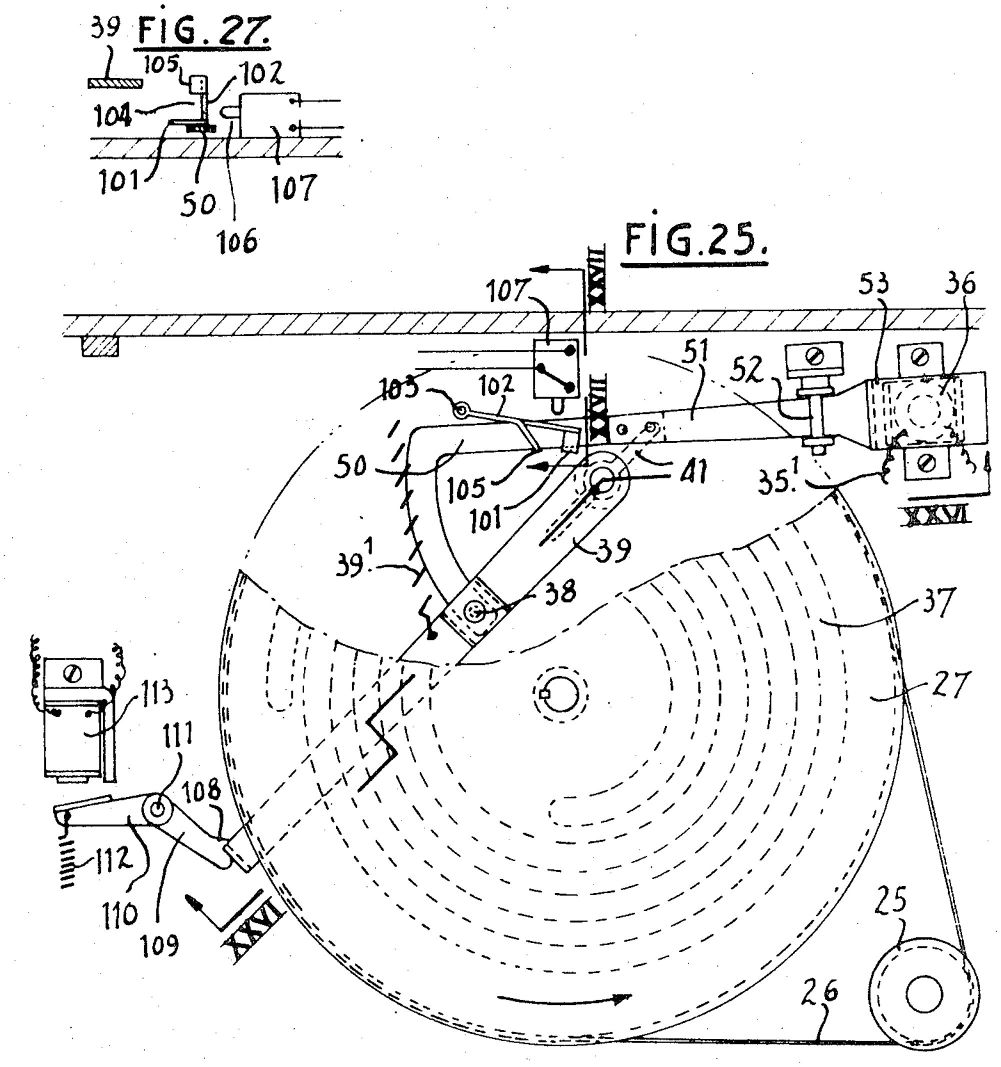
Figure 30:
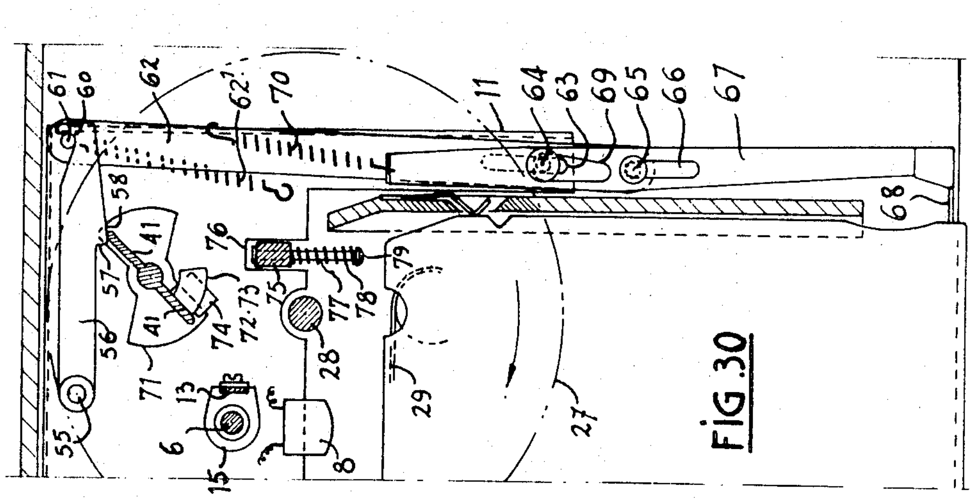

The energization of the solenoid 36 also causes the spring strip 50 to apply a thrust to the head 49 (FIG. 18) of rod $38^1$ which bears a tip 38. The tip 38, since flywheel 27 is rotating, is introduced into groove 37 in which, because of the spiral shape thereof (FIG. 20), the tip 38 moves towards the center of flywheel 27 (FIGS. 19 and 22). The lever 39, to which the tip 38 is axially secured, pivots (FIG. 22) around its pin 40 until reaching the position which is shown in FIG. 25, in which position the lever 39 is retained by a pawl 108 formed on the end of a double-armed lever 109, 110 which pivots around spindle 111 and is biased by a spring 112. The solenoid 113, when energized, controls the pivoting of the lever 109, 110, releasing the lever 39 by retraction of the pawl 108.

The tip 38 has left the spiral groove 37 by the time that it reaches the position shown in FIG. 25, the exit from the groove 37 being facilitated by an inclined surface 114 (FIG. 16) which forms the innermost end of the groove. Meanwhile, lever 39 has released lever 102 which now rests on lever 50 (FIGS. 25–27); solenoid 36, whose energization time depends upon the capacitance of capacitor 94, has dropped out.

Means are provided for exactly positioning and holding the slide in the position opposite the cartridge. Referring to FIG. 5, it is seen that the butterfly cam 41, when driven by lever 39 secured to spindle 40, is rotated such that the teeth 72 of the cam 41 corresponding to the location of slide 4 engage the spur 74 to secure the slide.

For the purpose of properly terminating the scanning function, the cam 41 also acts to disconnect the motor 17 from the band 13 as the slide is secured in an operative position. As the lever 39 moves towards the center of the flywheel, the cam 41 rotates the lever 80, 81 about its spindle 82. As this happens, the pin 83 moves the pinch roller 20 via an extension 84 thereof to disengage the roller from the band 13.

In addition to securing the slide and stopping the scanning function, the movement of lever 39 (and rotation of cam 41 fixed thereto) toward the center of the flywheel causes other means to pull the cartridge at the level of the slide to the operative position, by means of which movement, the magnetic tape 29 is brought into contact with the capstan 28 and the head 79. To this end, the cam 41, as it follows the lever 39 in its rotation toward the center of the flywheel, also acts on the edge 58 of the lever 56 (FIGS. 28, 29) and pivots the lever 56 around the pin 55. This causes the tip 61, which was at the beginning of the inclined surface 59 at the start of the movement (FIG. 3), to slide along the surface 59 and to take up a position in the recessed part of the hook 60 (FIG. 28). During this movement, the system formed by the levers 62, 67, which are relatively firmly interconnected by way of the pin 55 and the slot 66, because of being pivoted around the pin 64 and the hook 68 has taken up a position in front of the cartridge 2 (FIG. 28). Since the cam 41 continues to rotate the lever 56 around the pin 55, the system formed by the levers 62, 67, makes a sliding movement and, via hook 68, moves the cartridge 2 to the operative position (shown in FIG. 29). In the operative position the capstan 28 can move the tape 29 past the head 8 and the feelers 9, the latter also having been placed in contact with the tape 29. The cartridge 2 has also acted on the head 79 of the rod 77 and compressed the spring 78.

If, by accident, the cartridge had been inserted far enough to be sensed by the scanning mechanism but not far enough to be engaged by the hook 77$^1$ (FIG. 30), then the hook 68 would strike the cartridge side surface. Because of the special shape of the slot 69, the lever 67 would not be compelled to take up the same inclination as the lever 62, and the hook 68 could therefore slide along the cartridge side surface without damaging the mechanism (FIG. 30), the spring 70 taking up the difference in the movement.

Once the cartridge has reached the operative position (FIG. 29) and the cam 41 is at the end of its travel, the finger 38 reaches the end of the spiral groove 37 and is ejected therefrom via the inclined surface 114. The lever 39, with which the cam 41 rotates, has reached the position shown in FIG. 25 and is retained in this position by the pawl 108, which is biased by the spring 112.

At this stage, the tape 29 is being driven and playing can start.

Figure 34:
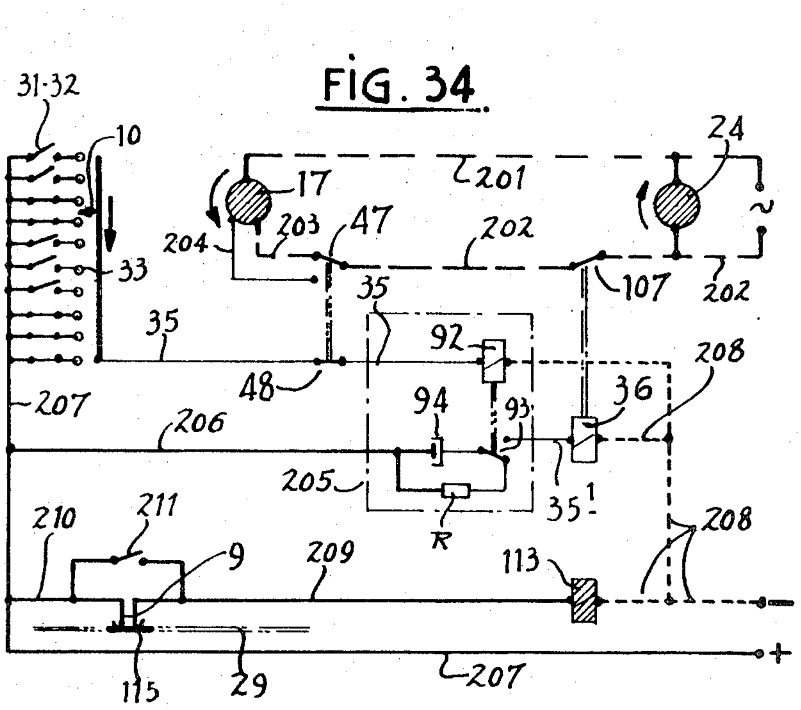

When the tape has been driven to its conclusion, it is desirable to eject the cartridge and activate the slide and scanning mechanism for movement to the next cartridge. For this purpose means are provided for sensing the end of the tape including a metal marking 115 fixed to the tape 29 and a pair of feelers 9 for sensing the metal marking. As illustrated in FIG. 34, the metal marking 115 closes a circuit between the feelers 9 to energize the solenoid 113. Referring to FIG. 25, it is seen that energization of the solenoid 113 will cause the lever 109, 110 to pivot so as to retract the pawl 108 and release the lever 39. Under the force of the spring 39$^1$, the lever 39 returns to the position shown in FIG. 14 (stand-by position for a new cycle). On its return to its stand-by or preparatory position, the lever 39 strikes the bent part 105 of the lever 102, causing the lever to pivot around the pivot 103 to close the switch 107. Closing the switch 107 energizes the motor 17 (FIG. 34), which in turn lowers the slide 4 to scan the succeeding cartridge locations until its feeler 10 again reaches a stud 33 energized by the presence of a cartridge. The cycle then starts all over again.

These cycles repeat until the slide 4 has descended to the level of the final cartridge. When the final cartridge has finished playing, the metal mark 115 will close the circuit between the feelers 9 to energize the solenoid 113. The pawl 108 is retracted to release the lever 39, which returns to its stand-by position for the next cycle. The motor 17 causes the slide 4 to descend from the last position; however, the slide 4 immediately strikes the abutment 45 of rod 43. Referring to FIG. 6, it is seen that rod 43 has a cam 46 attached thereto. As the slide 4 strikes the abutment 45, the cam 46 opens the switch 48 and operates the reversing switch 47 (FIG. 36), causing the motor 17 to reverse direction. The slide 4 will rise to the top position, with the feeler 10 making contact with each of the studs 33 on the way up. However, with the switch 48 in the open position, the control circuitry for stopping the motor 17 is inoperative, and the slide moves to the top.

Figure 35:
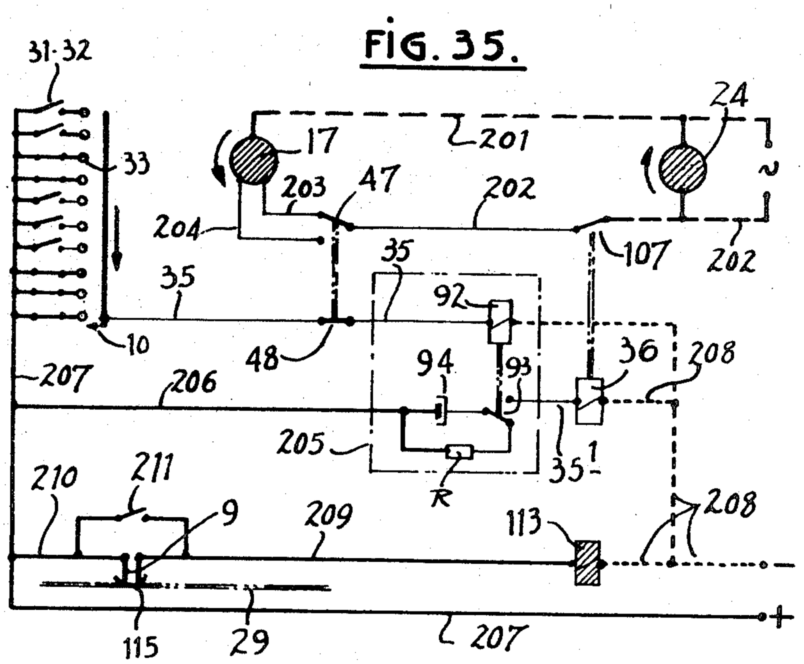
Figure 36:
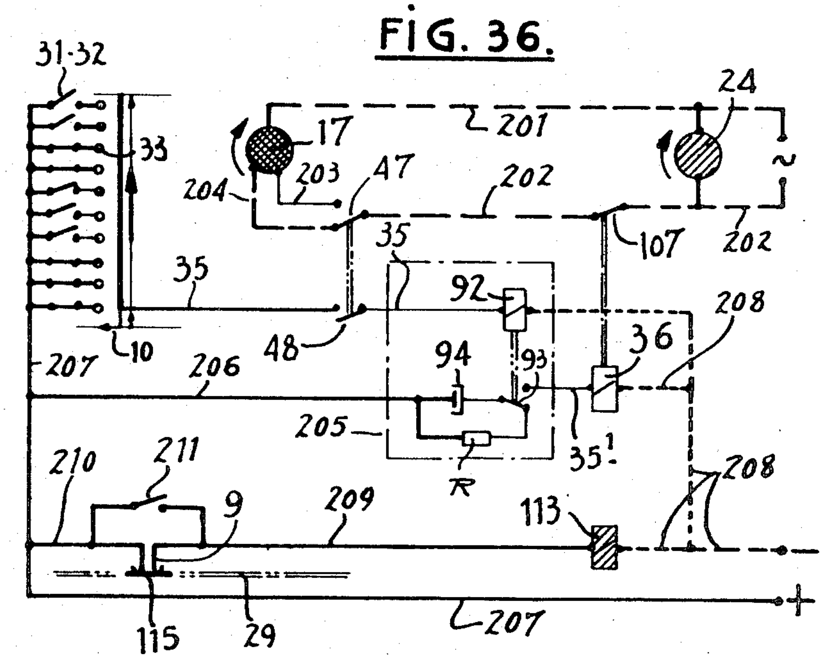
Figure 38:
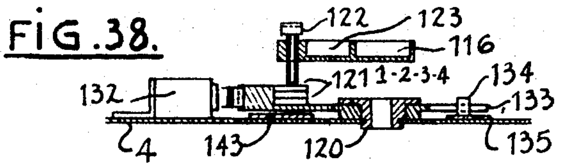
Figure 42:
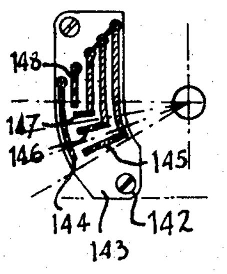

As the slide 4 reaches the uppermost position, it abuts the abutment 44 of the rod 43, causing the rod 43 to rise slightly so that its cam 46 returns the switches 48 and 47 to their original position, as shown in FIGS. 1, 6 and 35. This latter changeover occurs after the slide 4 has passed slightly beyond the position corresponding to the first cartridge location. With the switching of the switch 47 to its original position, the motor 17 resumes its original direction and the slide 4 descends again to scan for cartridges.

Figure 37:
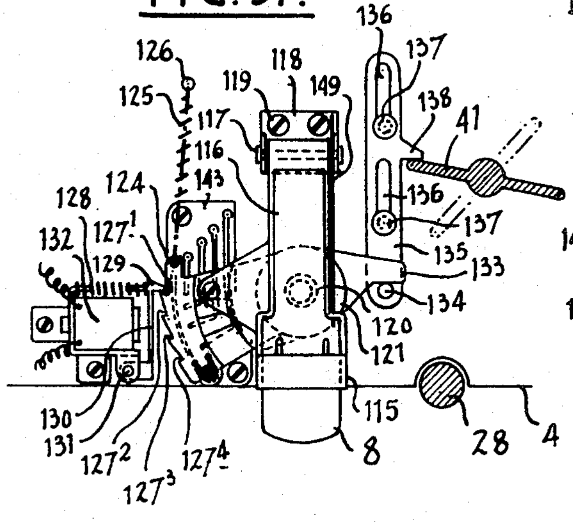
Figure 39:
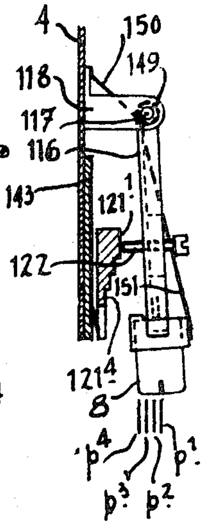
Figures 40, 43:
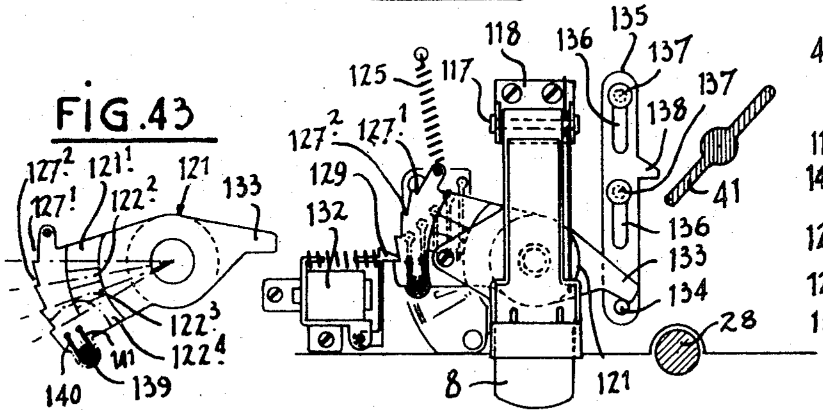
Figure 41:
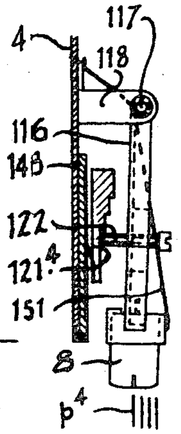

An alternative embodiment of the present invention is shown in FIGS. 37–49, in which means are shown by which the mechanism shown in the preferred embodiment may be adapted for use with multi-track magnetic tape cartridges. In this latter embodiment there is provided means for bringing the playback head to various levels corresponding to the different track levels of the magnetic tape being played. As shown in FIGS. 37 and 39, the head 8 is borne by a lever 116 in a recess 115, the lever 116 being pivotally mounted on a spindle 117 borne by a support member 118 which is secured by screws 119 to the moving slide 4. Pivotally mounted on a pivot pin 120 affixed to the slide 4 is a locating cam 121 comprising steps 121$^1$, 121$^2$, 121$^3$ and 121$^4$. A lug 123 forms part of the lever 116 and bears a settable screw 122 which impinges on and cooperates with the steps of the locating cam 121.

The locating cam 121 also includes a teat 124 to which a spring 125 is attached at one of its ends, the other end 126 of the spring being fixed to the slide 4. The outer edge of the cam 121 is formed with ratchet teeth 127$^1$, 127$^2$, 127$^3$ and 127$^4$. A pawl 129 is disposed on arm 130 which is pivotally mounted at a place 131 and adapted to be actuated by a solenoid 132. A thrust spring 128 biases the pawl 129 away from the solenoid 132 to cooperate with the ratchet teeth of the cam 121. The cam 121 also has a tailpiece 133 with which a teat 134 can cooperate, the teat 134 being mounted on slider 135 formed with a pair of slots 136 for guidance on rods 137 rigidly secured to the slide 4. The slider 135 has an abutment 138 adapted to be operated by the cam 41, the action of which has been described in connection with the previous embodiments.

A slider 139 having two arms 140, 141 is electrically insulated from the locating cam 121 and disposed near the lowest ratchet tooth 127$^4$. A sheet or plate 143 is secured by screws 142 to the slide 4 and comprises a printed circuit having along one edge of the sheet 143 a band or strip 144, with which the slider arm 140 cooperates, and having slightly inward from said edge four studs 145–148, with which the slider arm 141 can cooperate. A spring 149 disposed around the spindle 117 has an arm 150 which impinges on the slide 4 and an arm 151 impinging on the recess 115 so as to bias the sound head 8 and its pivotable lever 116 toward the slide 4. The tension created by the spring 149 causes the settable adjusting screw 122 to be in continuous contact with one of the steps of the cam 121 at all times.

It will be recalled that on changing over from the operative position (FIG. 25) to the new cycle stand-by position (FIG. 14) the butterfly cam 41 experiences clockwise rotation. Referring then to FIGS. 37 and 39, it is apparent that the rotating cam 41 acts on the abutment 138 of the slide member 135, which, in turn, acts via the stud 134 on the locating cam 121. The resulting position finds the settable screw 122 resting on the first cam step 121$^1$, in which position the head 8 can play the recording on the first track of the tape of any cartridge (FIG. 39). In this position, the pawl 129 engages the ratchet tooth 127$^1$ to retain the cam 121.

Figure 44:
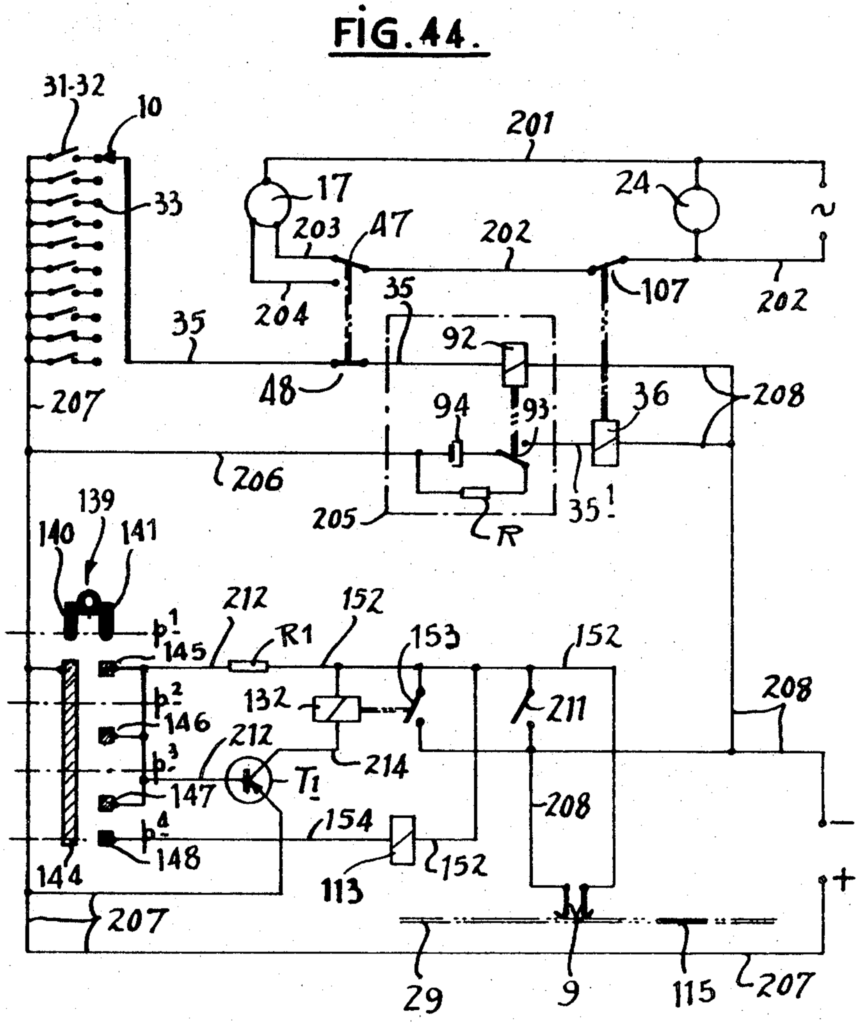

The electrical circuitry for this embodiment is only slightly more involved than that shown for the previous embodiments (FIG. 34). FIG. 44 shows the basic diagram from a tape having four tracks, $P_1$, $P_2$, $P_3$ and $P_4$. The top part of the diagram is the same as for single track operation, and cartridge introduction closes the switching elements 31, 32, 33 in the same manner as shown in FIG. 34. As in the diagram shown in FIG. 31, the wire 207 is connected to the positive side of the supply and to the capacitor 94 and all the metal strips 31, but in this case it also applies positive potential to the collector of a transistor $T_1$ and the strip 144 of the plate 143. The line 208 is connected to the negative side of the power supply and applies a negative potential to one of the two feelers 9, one side of the reject switch 211, one side of an on-off switch 153 operable by a solenoid 132 (FIG. 37) and, as in the previous embodiment, to one side of each of the solenoids 36, 92. The conductor 212 connects the studs 145, 146, and 147 to the base of the transistor $T_1$ and to one side of a resistor $R_1$, while a line 154 connects the last stud 148 to one terminal of the solenoid 113, the other terminal thereof being connected by a conductor 152 to the other feeler 9 and to the other side of the switches 211, 153, the solenoid 132 and the resistor $R_1$. A line 214 connects the solenoid 132 to the output of the transistor $T_1$.

Figure 45:
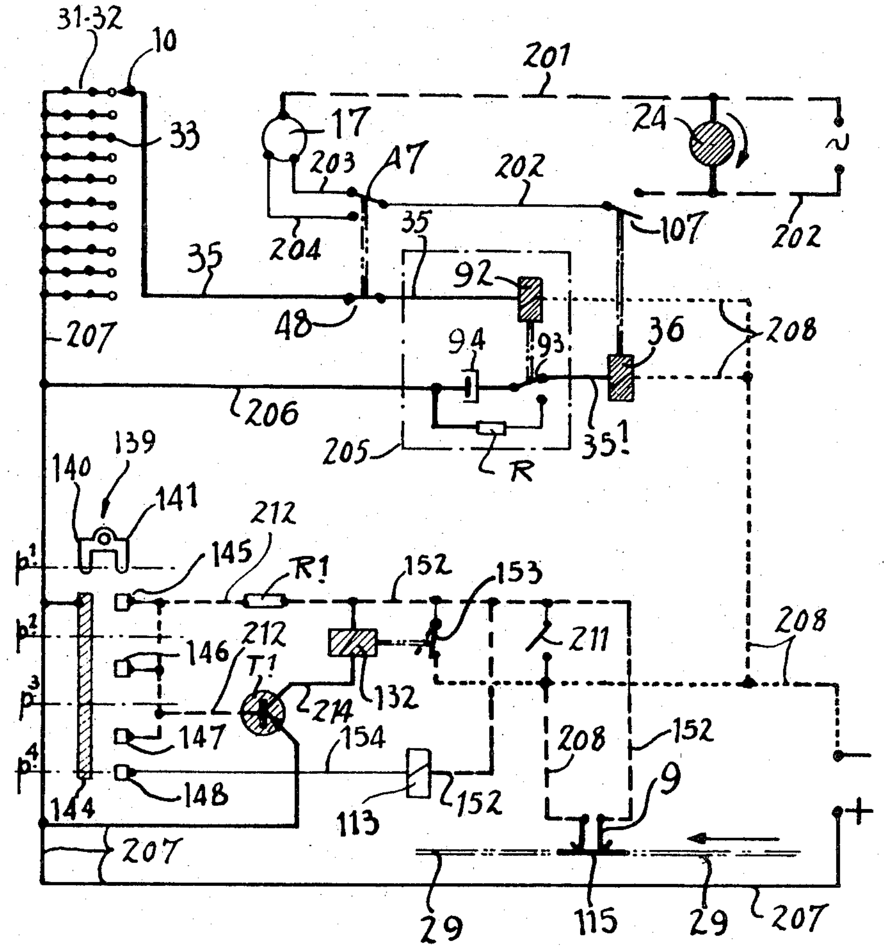
Figure 46:
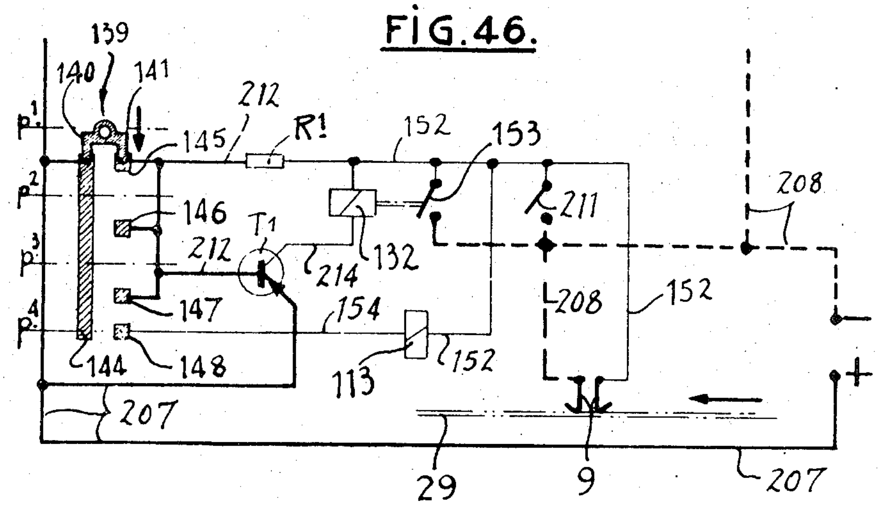
Figure 47:
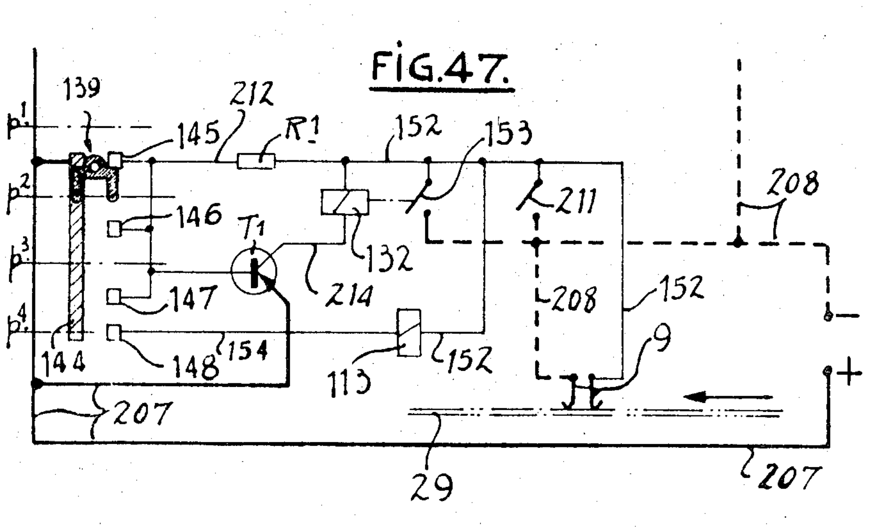
Figure 48:
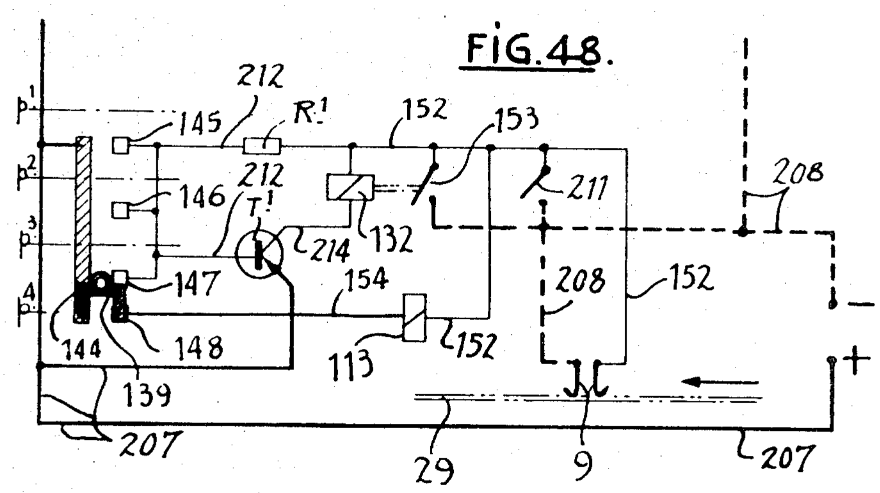
Figure 49:
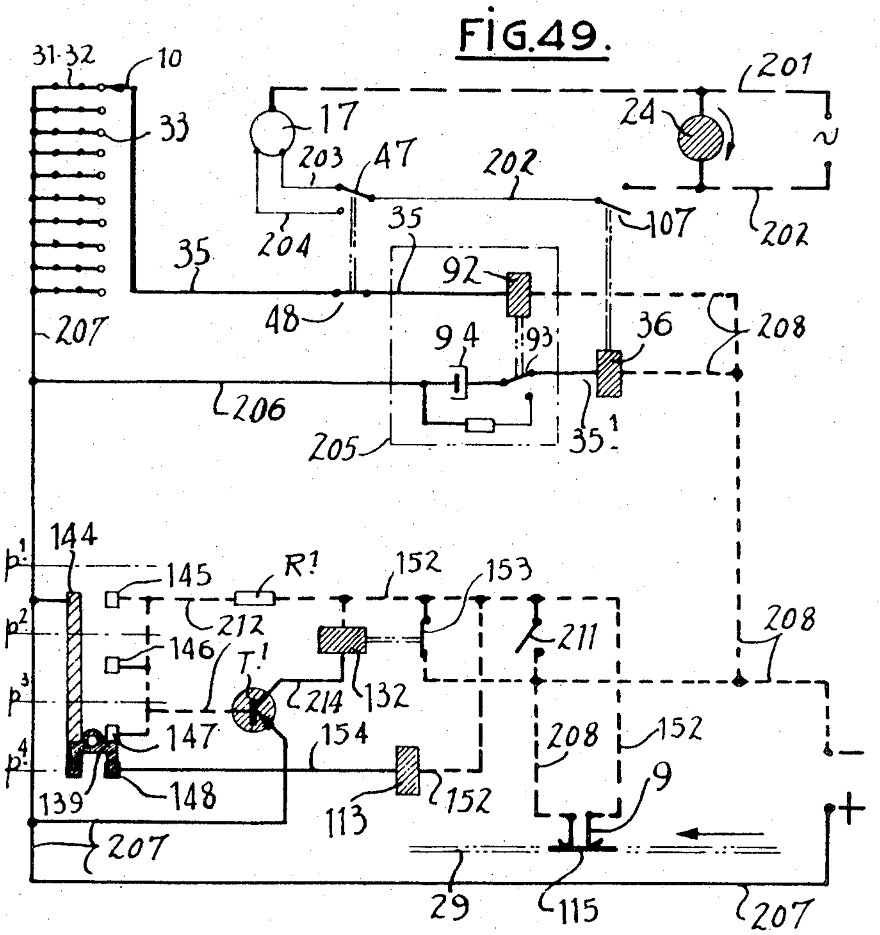

For purposes of this description, assume that the tracks $P_1$ has just been played, as shown in FIG. 45. The metal end of the track tape 115 closes contact between the feelers 9 so that a negative potential is briefly applied via the line 152 to solenoid 132. At the same time the negative potential forward biases the base of the transistor $T_1$ via the resistors $R_1$ and conductors 212, causing a positive potential to be applied to the solenoid 132 via conductor 214. Solenoid 132 "pulls-in" and releases the pawl 129 from the ratchet tooth 127$^1$, while closing a switch 153 via which the negative potential can be applied to the solenoid 132 and to the base of the transistor $T_1$ through the resistor $R_1$ even though, as a result of the advance of the magnetic tape 29, contact has ceased between the metal strip or band 115 and the feelers 9. Once the cam 121 (FIG. 43), which is pulled by the spring 125, has pivoted through a predetermined angle around the pivot pin 120, slider 139 brings the band 144 into contact with the stud 145. As shown in FIG. 46, this contact will shunt out the forward bias which has been applied to the base of the transistor $T_1$, rendering that transistor non-conductive and cutting off the supply to the solenoid 132. As the solenoid 132 drops out, the pawl 129 is released to the control of the biasing spring 128 which urges the pawl into engagement with the next ratchet tooth 127, which has been moved into position for engagement by the spring 125. Since the spring 149–151 biases the magnetic head 8 toward the slide 4, the abutment screw 122 moves from the cam step 121$^1$ to the cam step 121$^2$, causing the head 8 to assume a position opposite the track $T_2$. The track $T_2$ is then played until its end, at which time the metal end-of-tape band 115 closes contact between the feelers 9. The same cycle of operation will again take place for positioning the head 8 for playing the track $P_3$, and then track $P_4$. Thus it is seen that the several tracks of the multi-track tape are played in sequence without an intervening actuation of the cartridge elements previously described.

However, when the apparatus is in the position for playing track $P_4$, the stud 148, which is connected to the solenoid 113 by the conductor 154 (FIG. 48), is electrically connected to the strip 144 by the slider 139. This results in a positive potential being applied to one side of the solenoid 113. Consequently, at the end of this fourth track $P_4$, the end-of-tape band 115 closes contact between the feelers 9 (FIG. 49) to apply a negative potential via the conductor 152 to energize the solenoid 113. The pull-in of solenoid 113 rotates the lever 109, 110, releasing the lever 39 to rotate in a clockwise direction under the force of the spring 39$^1$. The cartridge scanning apparatus will be actuated, and the slide 4 will move down to the next cartridge in a manner identical to that described for the previous embodiments.

The contact between the end-of-tape band 115 and the feelers 9 at the end of the fourth track $P_4$ also leads to energization of the solenoid 132 via the conductor 152. The solenoid 132 retracts the pawl 129 from the ratchet tooth 127$^4$ so that the cam 121 can return to the position for playing track $P_1$. During this return movement, the slider 139, in its passage over the studs 147, 146, 145, shunts out the forward bias to the base of the transistor $T_1$ via the conductor 212. This causes the solenoid 132 to drop out, the cumulative result being that the head 8 and the locating cam 121 are now in a position appropriate for the performance of a new cycle, ready to be stepped through the four tracks of the next cartridge.

It will be readily seen that the embodiment described above is not limited to tape with four tracks only, but rather is adaptable for tapes having any number of tracks spaced across the magnetic surface.

Figures 50, 51, 52, 53, 54, 55, 56:
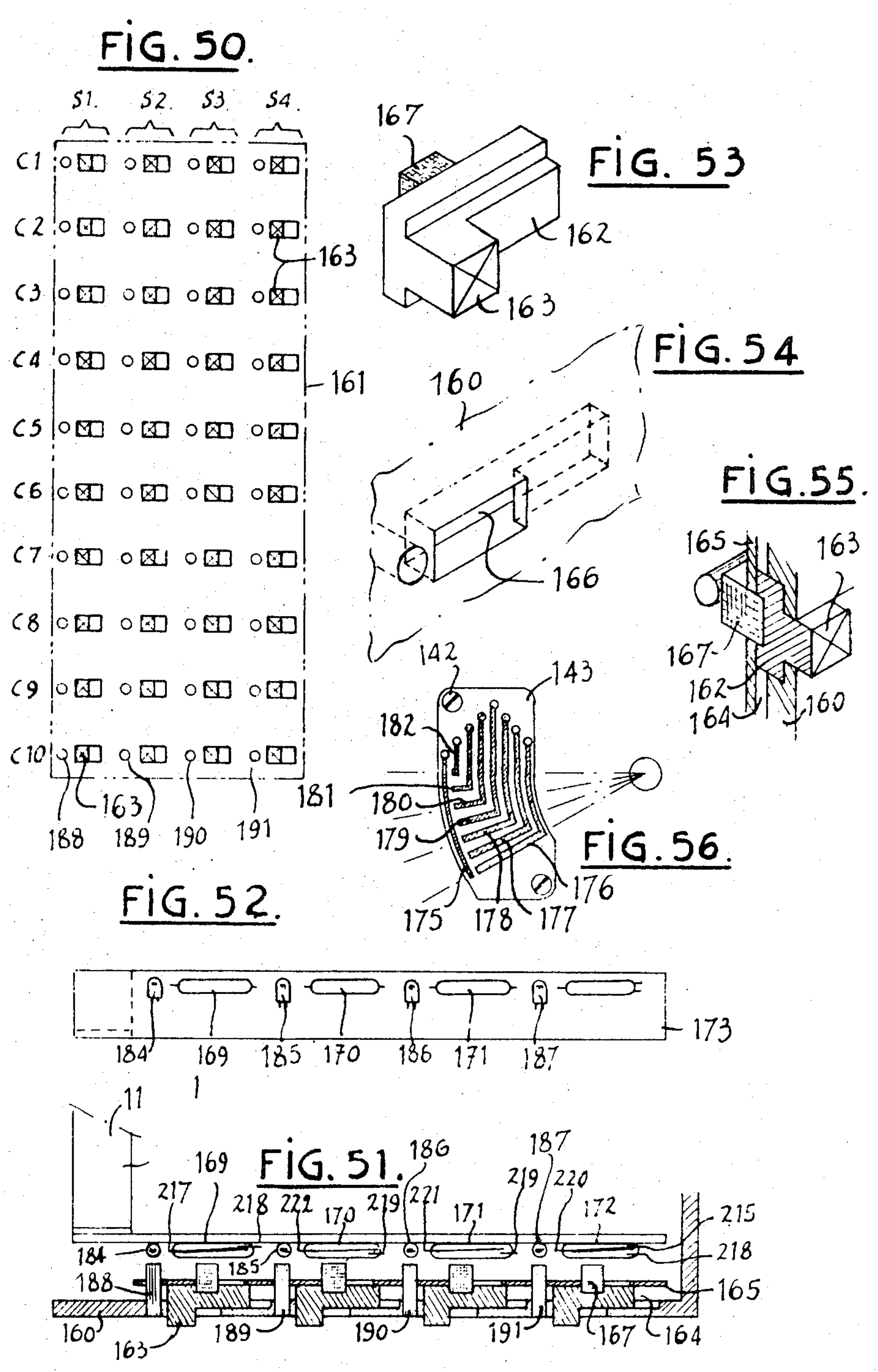

In a further embodiment of the present invention, as shown in FIGS. 50–64, means are provided for the playing of preselected tracks of a cartridge or cartridges to the exclusion of those tracks on the inserted cartridges which are not selected for playing. To this end, the changer is provided with a table 161 on its front surface 160 for slide-button selection of the individual tracks to be played. As shown in FIGS. 50 and 51, the table 161 has levels C1 through C10 corresponding to the possible cartridges to be inserted. At each of the cartridge levels of the table 161 there is a rule of indicators, the number of which corresponds to the number of tracks on the tape of each cartridge. In the examples shown in FIGS. 50 and 51, each level has four actuators, S1, S2, S3 and S4. Each actuator is adapted to be in one of two positions, corresponding to selection or nonselection of a track. In FIGS. 50 and 51, the actuators are all shown in the nonselection position.

As shown in FIGS. 50–55, the actuators of the present invention are in the form of sliders 152 having a control knob 163. The knob 163 can move in a recess 164 bounded by the table 160 and a base 165. The knob 163 projects outside the table 150 and is disposed for manual sliding in the aperture 166 (FIG. 54). Each slider 162 has at its rear a magnet 167 movable with the slider 162 in an aperture 168 of the base 165. Cooperating with the magnets 167 are read switches 169–172, one of which is disposed opposite each magnet 167, these switches being mounted on a plate or support 173 secured to the end of the slide extension 11 (see FIGS. 1 and 51). In the example shown in FIG. 51, there is a normally closed switch 169, normally open switches 170, 171 and the changeover switch 172 of the single pull-double throw variety.

In operation, it is seen that the selection of a track is made by positioning the control knob 163 and its associated slider 162 in a position opposite that shown in FIG. 51. When the slide 4 makes its scanning movement, therefore, the magnet 167 attached to the selected slider acts on whichever switch 169–172 is opposite the select position. For instance, if all of the actuators at a certain level are slid to the position opposite that shown in FIG. 51, all of the magnets 167 will have moved to the right. As the slide 4 makes its scanning movement past this level, the switch 169 will change over to the open condition, the switches 170, 171 will close, and the changeover switch 172 will switch contacts.

Figure 57:
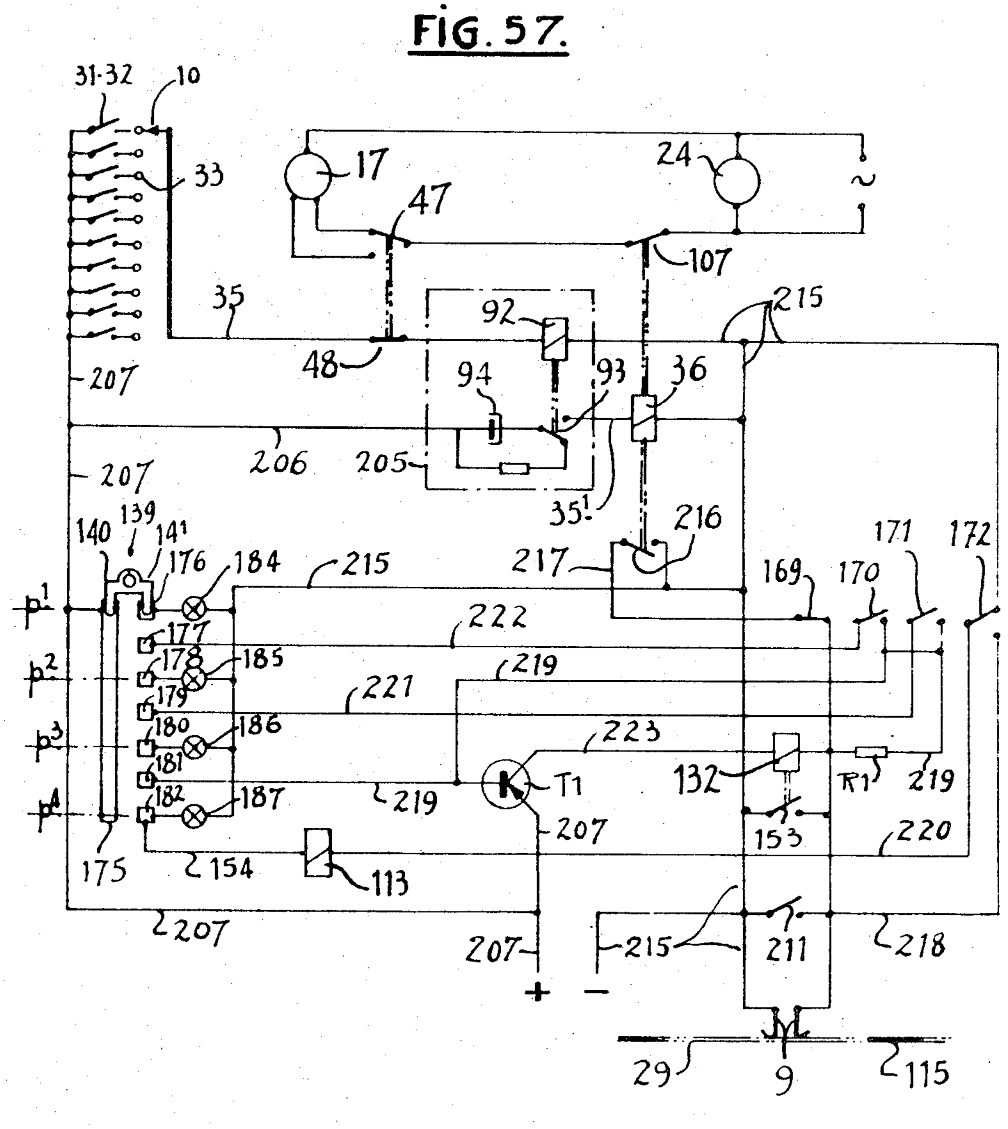

As shown in FIG. 52, beside each switch 169–172 secured to the support 173 are lamps 184–187 respectively which give a visual indication of the cartridge and the track actually being played by illuminating an aperture 188–191 respectively near the corresponding actuator on the table 161. The playback head 8 and its support mechanism is constructed as in the embodiment shown in FIGS. 37–43, with the exception that the printed circuit on the plate 143 secured to the slide 4 has been modified to accommodate the additional switching required for this embodiment. As shown in FIGS. 56 and 57, the printed circuit includes a band 175 disposed near its outer edge, with which the arm 140 of the slider 139 cooperates. Seven studs 176–182 are disposed adjacent to the band 175 to cooperate with the arm 141 of the slider 139.

In the present embodiment the solenoid 132 acts in a manner similar to that described for the embodiments shown in FIGS. 44–48. However, the energization of the solenoid 132, in the present case, is controlled by the switches 169–172 in accordance with the initial selection of tracks to be played.

As shown in FIG. 57, each of the studs 176, 178, 180 and 182 is connected to the terminal of the lamp 184–187, respectively. The other terminal of each lamp is connected to a common conductor 215 electrically connected to the negative side of the supply. The common connector 215 also supplies negative potential to the feelers 9, one side of the switch 153, one side of the switch 216 operated by a solenoid 36, one side of that same solenoid 36, one side of the solenoid 92 and one side of the selection switch 172. When the playback head 8 is opposite one of the tracks, the slider 39 applies a positive potential to the corresponding lamp via one of the studs 176, 178, 180, or 182. The switch 169 has its contact arm permanently connected to the switch 216 via a conductor 217, while its normally closed contact is connected via a conductor 218 to one terminal of the solenoid 132, one terminal of the switch 153, one terminal of the reject switch 211, the other feeler 9 and the second terminal of the selection switch 172. In this embodiment the resistance $R_1$ has one end connected to the conductor 218 and the other end connected to the normally open contacts of the selection switches 170, 171, to the base of the transistor $T_1$ and to the stud 181. As in the previous embodiments the resistor $R_1$ is adapted for biasing the transistor $T_1$ to the ON condition when a negative potential is connected thereto. A line 220 connects the solenoid 113 to the contact arm of the changeover switch 172, while another line 221 connects the stud 179 to the contact arm of the switch 171. Finally, a line 222 connects the stud 177 to the contact arm of the selection switch 170.

Figure 58:
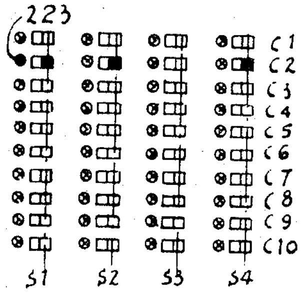
Figure 59:
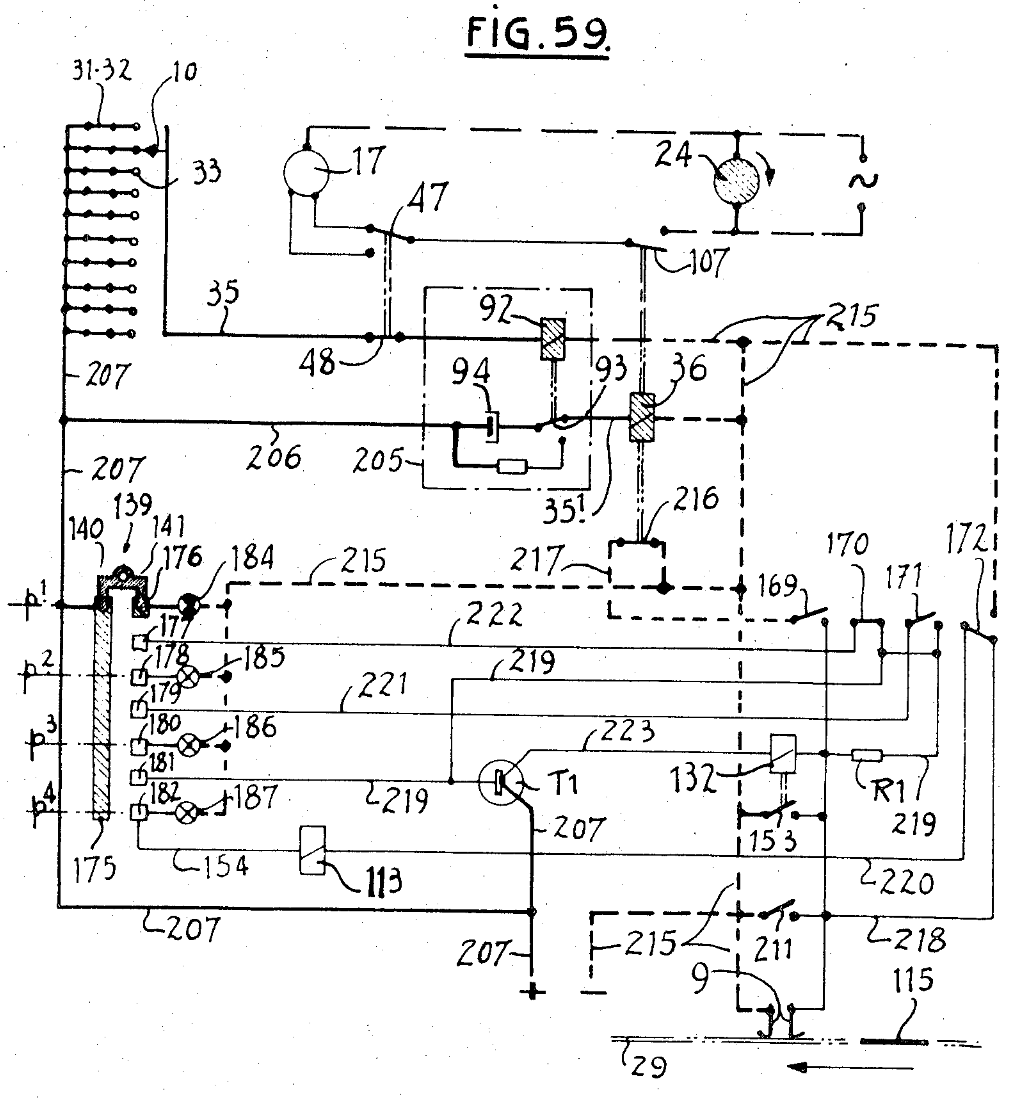

To facilitate the description of the operation of this embodiment, assume that tracks one, two and four of the cartridge in level $C_2$ of FIG. 50 have been selected, as shown in FIG. 58. As the slide 4 descends in its scanning movement to this position, the contact arms of the selection switches 169, 170, and 172 are tripped. It will be remembered from the previous embodiment that the head 8 always returns to the level of the first track of the cartridge after ejection of the cartridge. Thus, the first track of the cartridge at level $C_2$ will be played first. The connections corresponding to the playing of this track are shown in the circuit of FIG. 59. The lamp 184 corresponding to the first track illuminates the aperture 223 corresponding to the first track of the second cartridge position or level $C_2$ (FIG. 58).

Figure 60:
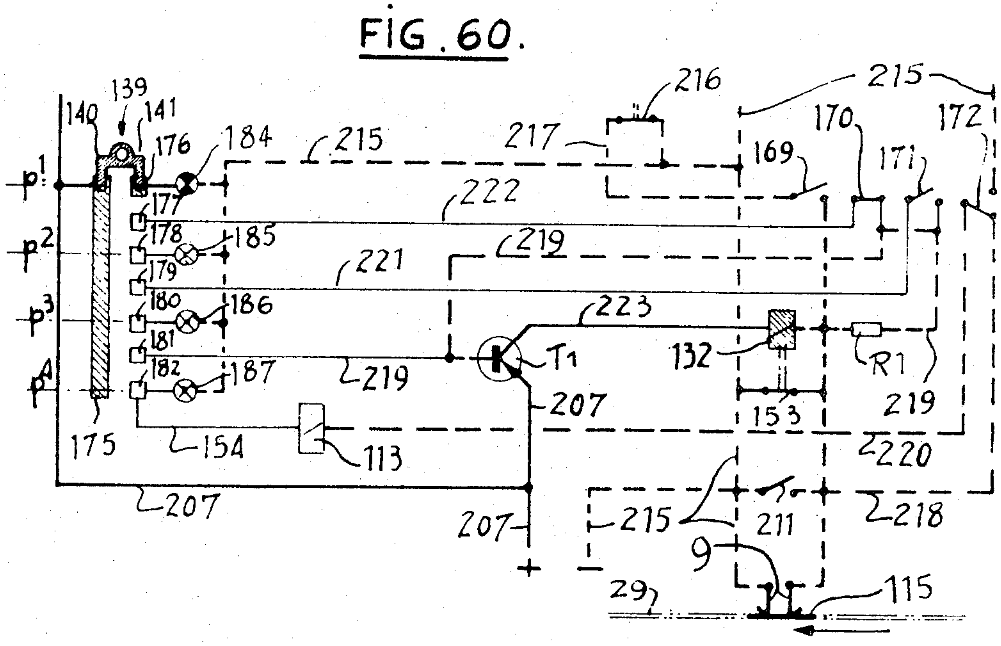
Figure 61:
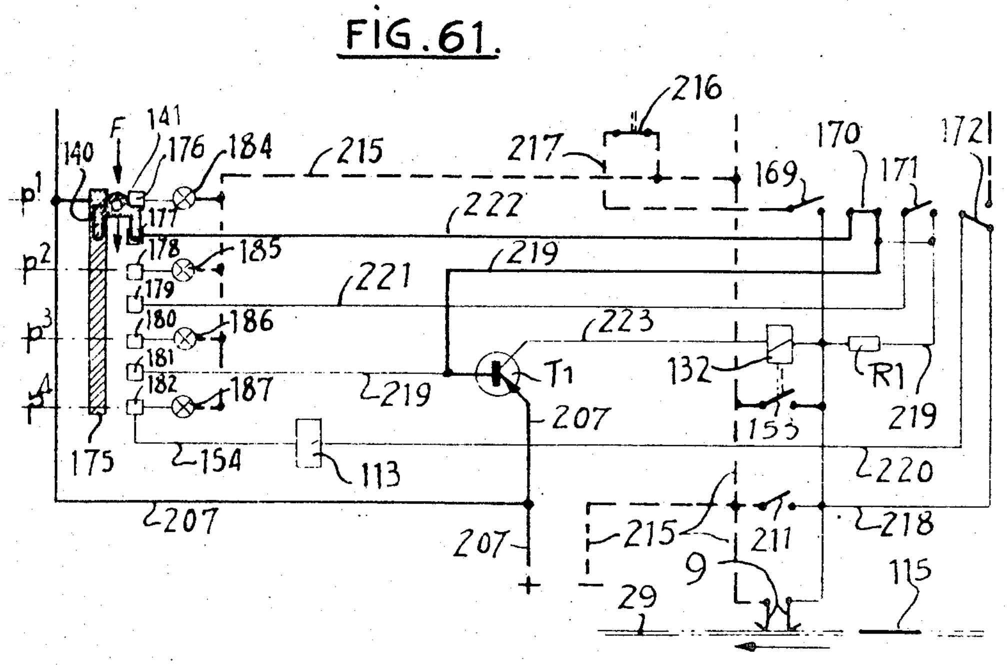
Figures 62, 63:
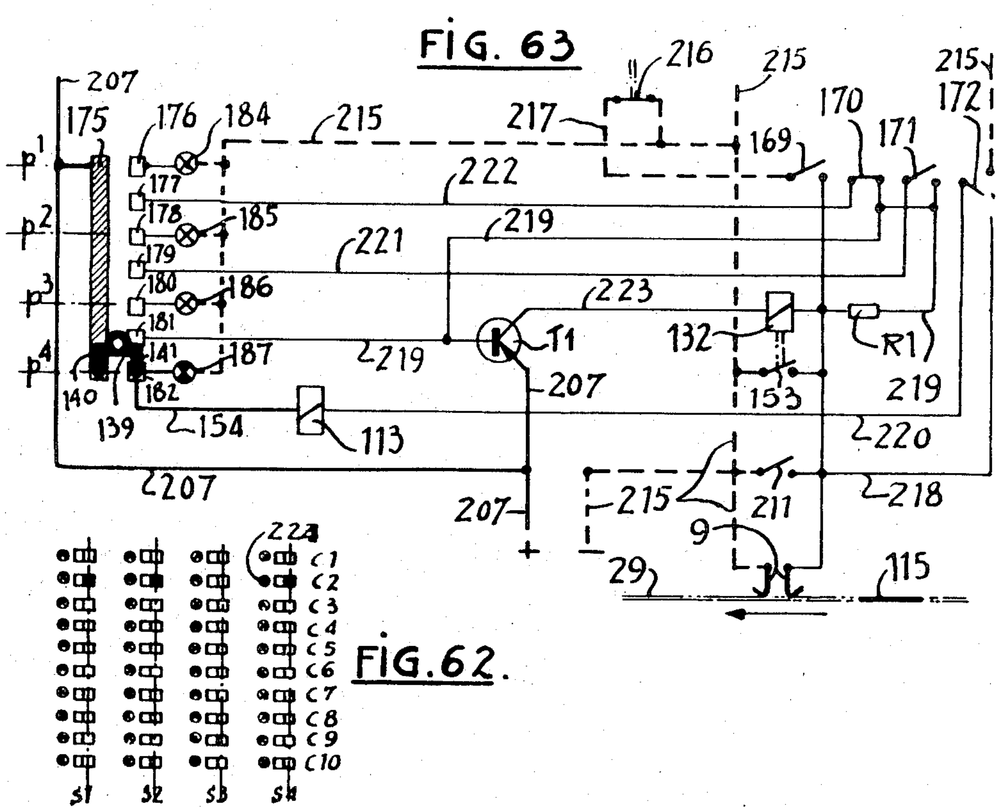
Figure 64:
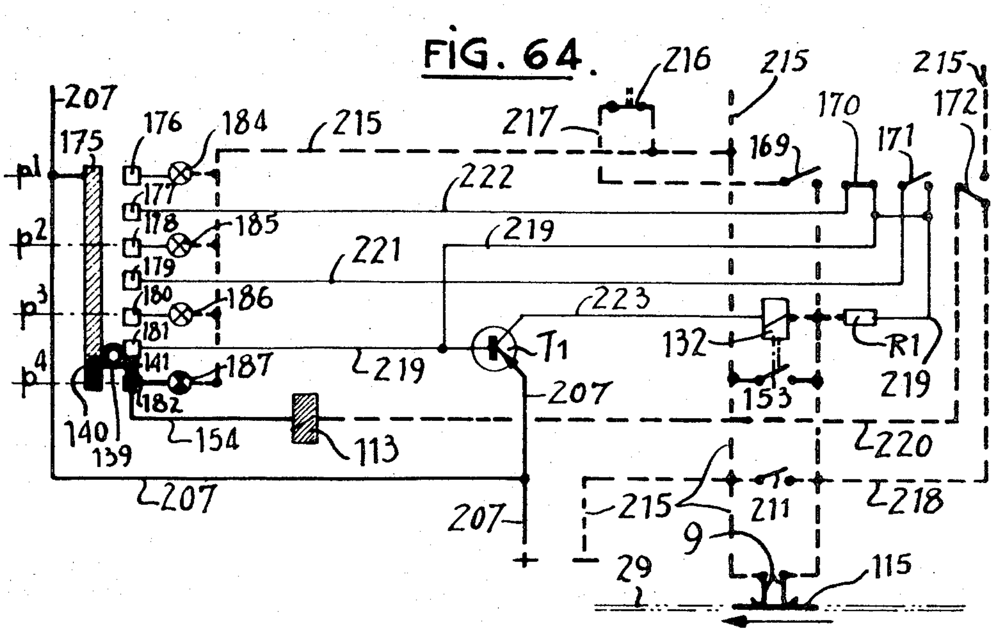

Upon completion of playing of the first track, the end-of-tape band 115 shortcircuits the feelers 9 (FIG. 60). As described in the previous embodiment, the potential supplied by way of the band 15 and the feelers 9 energizes the solenoid 132 to retract the pawl 129 and allow the cam 121 to rotate under the force of the spring 125. As it rotates, the cam 121 moves the slider 139 to close the circuit between the positive potential strip 140 and the stud 177 (FIG. 61). This results in a positive potential being applied to the base of the transistor $T_1$, the wire 222, the switch 170 and the wire 219. The positive potential at its base biases the transistor $T_1$ to the OFF condition, causing the solenoid 132 to drop out. Drop out of the solenoid 132 allows the pawl 129 to engage the second ratchet tooth $127^1$ of the cam 121 such that the second track of the tape will be played. When the playing of the second track is completed, the solenoid 132 will again be energized to allow rotation of the cam 121. Since the third track has not been selected for playing, the switch 171 is open (FIG. 61). Thus the slide 139 is ineffective to turn off the transistor $T_1$ when it applies the positive potential to the stud 179. The solenoid 132 remains energized, and the cam 121 continues to rotate until the slide 139 makes contact between positive potential strip 175 and the stud 181 corresponding to the fourth track, which is a selected track. The solenoid 132 drops out and the fourth track is played. Upon the completion of the playing of the fourth track, the end-of-tape band 115 shortcircuits the two feelers 9, energizing the solenoid 113 (FIG. 64) and causing the cartridge to be ejected. The ejection process is identical to that described for the previous embodiments. As previously described, the slide 4 will then continue its descending scanning movement to hunt for other cartridges with selected tracks. When, in its descending scanning movement, it reaches a level at which a cartridge is located, it will cause the cartridge to be moved into operative position, and will play each of the selected tracks in sequence, with the mechanism just described.

This embodiment of the invention thus provides the facility of selecting in any cartridge loaded in the apparatus, only these recording tracks containing the recordings which the listener desires to hear, and the mechanism will play all the selected tracks in sequence and complete the cycle of operation by returning the scanning slide to its start position.

I claim as my invention:

1. An apparatus for playing self-contained cartridges of magnetic recording tape, comprising, a stationary frame having adjacently disposed sets of opposed guides adapted to slidably receive a plurality of cartridges and hold them in side-by-side locations in the frame;

tape drive means including a motor carried by said frame and a capstan shaft driven by said motor; and a movable slide supported on said frame and operable to move along the locations defined for said cartridges in a scanning movement, said slide bearing a playback head movable into operable position adjacent a cartridge in any one of said locations in said frame and means comprising a linkage movable by said capstan shaft drive motor after stoppage of said slide adjacent a cartridge at any one of said locations into engagement with a cartridge for moving the cartridge into playing position against the playback head on the slide;

said capstan shaft carrying a flywheel with a spiral groove, said flywheel being connected to move the said linkage on said slide by means including a pivotable lever having an appendage movable into said flywheel groove to cause pivotable movement of said lever upon radial movement of said appendage relative to and upon rotation of said flywheel.

2. An apparatus according to claim 1 in which said means connecting said flywheel to move said linkage includes a butterfly cam movable by said pivotable lever to move said linkage.

3. An apparatus according to claim 2 in which said butterfly cam is supported on a shaft extending past all of said cartridge locations in the frame, and including means for locating and stopping the slide adjacent said cartridge locations, said slide being formed with an aperture resembling in shape two sectors disposed with their apexes opposite one another, said butterfly cam being formed along its length, at each slide stop level adjacent a cartridge location, with pairs of teeth, the two teeth of each pair cooperating to bound a zone defining the slide position for tape playback and adapted to engage the edge of one of the sectors of the aperture.

4. An apparatus for selectively playing a plurality of recording tracks on self-contained cartridges of magnetic recording tape, comprising a stationary frame having adjacently disposed sets of opposed guides adapted to slidably receive a plurality of cartridges and hold them in side-by-side locations in the frame;

tape drive means carried by the frame;

a movable slide supported on the frame and driven to move along the location defined for said cartridges in a scanning movement, said slide bearing a playback head movable into operable position adjacent a cartridge in any one of said locations in the frame and between a plurality of positions at the operable position corresponding to a like plurality of spaced recording tracks on the cartridge tape;

means effective after stoppage of the playback head in an operable position adjacent a cartridge for moving the cartridge into playing position against the playback head; and means for selectively controlling the positioning of the playback head on the slide, including a member mounted on the slide bearing a printed circuit having a first conductive band and a plurality of spaced position-selecting conductive bands, means for electrically energizing said first band, a movable slide adapted to electrically connect said first band and each of said other bands, and means responsive to said movable slide electrically connecting said first band and each of said other bands to control the positioning of said playback head.

5. An apparatus according to claim 4 wherein said means responsive to said movable slide includes a lever supporting said playback head and pivotally supported by a spindle carried on said slide, a locating cam having steps for adjusting the lever to move the playback head between the plurality of recording track positions, ratchet means formed on said cam, means operatively connected to said ratchet means for biasing said cam to adjust the lever, and a pawl mounted on an arm operated by a solenoid carried by said slide and engageable with said ratchet means to restrain the movement of the playback head between the recording track positions.

6. An apparatus for selectively playing a plurality of recording tracks on self-contained cartridges of magnetic recording tape comprising a stationary frame having adjacently disposed sets of opposed guides adapted to slidably receive a plurality of cartridges and hold them in side-by-side locations in the frame;

tape drive means carried by the frame;

a movable slide supported on the frame and means for driving said slide to move along the locations defined for said cartridges in a scanning movement and for stopping the slide adjacent a selected cartridge at any one of the cartridge locations;

a playback head movably mounted on said slide for movement to spaced positions corresponding to spaced recording tracks on the tape in the cartridges; and a control means effective after stoppage of the slide adjacent a selected cartridge to control the positioning of the playback head for playback of selected recording tracks in the selected cartridge, said control means including a control panel carried by said frame and having a plurality of manually operable selectors arranged in rank corresponding to the cartridge locations and in file corresponding to the recording tracks of each cartridge tape with each file of selectors being arranged adjacent to a cartridge location, each of said selectors having two positions corresponding to selection or non-selection of a recording track and comprising a slidable member carrying a magnet movable between said two positions, switch elements mounted in a file on said slide aligned with the files of selectors and the magnets carried thereby, each switch element corresponding to a recording track on the cartridge tapes and the scanning movement of the slide being effective to carry the switch elements into operative positions opposite the series of selector magnets on the panel to determine the operative condition of the switch elements, a member mounted on the slide bearing a printed circuit having a first conductive band and a plurality of spaced position-selecting conductive bands, means for electrically energizing said first band, a movable slider adapted to electrically connect said first band and each of said other bands, and means responsive to said movable slider electrically connecting said first band and each of said other bands and to the operative condition of said switch elements to control the positioning of said playback head for selectively playing the recording tracks of the selected cartridge.

7. An apparatus according to claim 6 in which said means for stopping said slide adjacent a selected cartridge comprises means on the slide including a feeler, and means on the frame including a conductive strip in each cartridge location movable into a selected-cartridge position, said feeler on said slide being sequentially, operably connected to said conductive strips as said slide moves in a scanning motion to complete an electric circuit for producing a signal indicative of the presence of a selected cartridge at a cartridge location, said signal being operative to stop the slide with said playback head in operable position adjacent the selected cartridge.

* * * * *